United States Patent
Kobayashi et al.

[11] Patent Number: 5,931,296
[45] Date of Patent: Aug. 3, 1999

[54] ACCOMODATING CASE FOR DISC CARTRIDGE

[75] Inventors: Daiki Kobayashi, Miyagi; Hiroshi Nakaizumi, Kanagawa; Shuichi Kikuchi; Takatsugu Funawatari, both of Miyagi, all of Japan

[73] Assignee: Sony Corporation, Tokyo, Japan

[21] Appl. No.: 08/894,167

[22] PCT Filed: Dec. 16, 1996

[86] PCT No.: PCT/JP96/03667

§ 371 Date: Nov. 12, 1997

§ 102(e) Date: Nov. 12, 1997

[87] PCT Pub. No.: WO97/22539

PCT Pub. Date: Jun. 26, 1997

[30] Foreign Application Priority Data

Dec. 15, 1995 [JP] Japan .................................. P7-327735
Feb. 19, 1996 [JP] Japan .................................. P8-055578
Apr. 22, 1996 [JP] Japan .................................. P8-100234

[51] Int. Cl.⁶ .................................................. B65D 85/57
[52] U.S. Cl. ...................................... 206/308.3; 206/459.5
[58] Field of Search .............................. 206/307, 308.1, 206/308.3, 309, 312, 459.5

[56] References Cited

U.S. PATENT DOCUMENTS

| | | | |
|---|---|---|---|
| 5,226,537 | 7/1993 | Ozeki | 206/459.5 X |
| 5,385,235 | 1/1995 | Ikebe et al. | . |
| 5,531,322 | 7/1996 | Iwaki et al. | 206/308.3 |
| 5,645,165 | 7/1997 | Taniyama | 206/308.1 |

FOREIGN PATENT DOCUMENTS

| | | |
|---|---|---|
| 0186359 A2 | 7/1986 | European Pat. Off. . |
| 000221749 | 5/1987 | European Pat. Off. ............. 206/308.3 |
| 0531113 A2 | 3/1993 | European Pat. Off. . |
| 0566403 A2 | 10/1993 | European Pat. Off. . |
| 61-22863 | 7/1986 | Japan . |
| 6-156567 | 6/1994 | Japan . |
| 6-336280 | 12/1994 | Japan . |
| 7-41940 | 5/1995 | Japan . |
| 7-187191 | 7/1995 | Japan . |
| 8-11973 | 1/1996 | Japan . |
| 2064486 | 6/1981 | United Kingdom . |
| 2278710 | 12/1994 | United Kingdom . |

*Primary Examiner*—Bryon P. Gehman
*Attorney, Agent, or Firm*—Limbach & Limbach L.L.P.

[57] ABSTRACT

An accommodating case adapted for accommodating a disc cartridge therewithin. This accommodating case includes a bottom plate on which the disc cartridge is mounted, and a pair of side walls provided in a manner opposite to each other on the both sides of the bottom plate, and comprises a case body in which at least the upper surface side and the front side are opened, and a cover body adapted so that the base end portion side is rotatably supported at the back side of the case body, and fitted between a pair of side walls to close the range or portion at least from the upper surface side toward the front side of the case body. At the inner surface sides opposite to each other of the pair of side walls provided at the case body, there are respectively provided limiting portions for supporting both side edges of the cover body to limit the cover closing position when the cover body is rotated so that it is located at the position where it closes the range or portion from the upper surface side toward the front side of the case body. The disc cartridge to be accommodated can be inserted into the case body in a desired insertion direction form the opened portion extending from the upper surface side toward the front side of the case body.

27 Claims, 9 Drawing Sheets

ACCOMODATING CASE FOR DISC CARTRIDGE

DESCRIPTION

1. Technical Field

This invention relates to an accommodating case adapted for accommodating a disc cartridge within which a disc-shaped recording medium such as optical disc or magneto-optical disc, etc. is accommodated.

2. Background Art

Hitherto, as a recording medium for information signals, disc-shaped recording media such as optical disc or magneto-optical disc, etc. have been used. In the case of disc-shaped recording media of this kind, there is the possibility that when dust is attached to the signal recording surface or such signal recording surface is damaged or injured, etc., missing of recording/reproduction signal may be caused to take place at the time of recording/reproduction of information signals. In view of the above, at the time of storage, etc. when such disc-shaped recording media are not loaded with respect to the recording and/or reproducing apparatus (hereinafter referred to as recording and/or reproduction unit as occasion may demand), such recording media are accommodated within respective disc cartridges in order to prevent that dust is attached thereto, or they are damaged, etc.

As a disc cartridge within which a magneto-optical disc which is a disc-shaped recording medium is accommodated, a disc cartridge constituted as shown in FIG. 1 is known.

It is to be noted that the optical disc of reproduction (playback) only type and the magneto-optical disc which permits re-recording of information signals will be generically named or called "optical disc" as described below.

This disc cartridge 100 includes, as shown in FIG. 1, a cartridge body 103 formed by butt-joining a pair of upper and lower halves 101 and 102 in a rectangular form, and is adapted so that an optical disc 109 is rotatably accommodated within the cartridge body 103.

At the cartridge body 103, a disc accommodating portion is formed by a circular-arc shaped rising wall having a diameter (inside dimension) slightly greater than the outer diameter of optical disc accommodated therewithin and (having height dimension) caused to be slightly greater than the thickness dimension of the optical disc. The optical disc 109 is rotatably accommodated through the disc accommodating portion.

Moreover, at the cartridge body 103, there are opened opening portions for recording and/or reproduction in a manner positioned substantially at the central portion in left and right directions extending from the central portion toward the front side at the upper and lower surfaces. The optical disc 109 accommodated within the cartridge body 103 is adapted so that a portion of the signal recording area is faced toward the external of the cartridge body 103 extending in the radial direction through the opening portions.

Further, at the cartridge body 103, a shutter member 104 for opening/closing the opening portions for recording and/or reproduction is attached so that it can be moved. This shutter member 104 is composed of a pair of shutter portions 105 having sizes (dimensions) sufficient to close the opening portions for recording and/or reproduction, and a connecting portion 106 for connecting these shutter portions 105. Thus, the shutter member 104 is formed so as to take substantially channel shape in cross section as a whole. The shutter member 104 is adapted so that when the disc cartridge 100 is loaded with respect to the recording and/or reproduction unit, the shutter member 104 is caused to undergo movement operation by the shutter movement operation member provided at the recording and/or reproduction unit side to open the opening portions for recording and/or reproduction, while at the non-use time such as storage, etc. when the disc cartridge 100 is not loaded with respect to the recording and/or reproduction unit, the shutter member 104 is held at the position where it closes the opening portions for recording and/or reproduction.

In the above-described disc cartridge 100, since the opening portions for recording and/or reproduction are closed by the shutter member 104 at the non-use time when the disc cartridge 100 is not loaded with respect to the recording and/or reproduction unit, admission of dust into the cartridge body 103 and/or inadvertently touching of finger with the optical disc 109 within the cartridge body 103 through the opening portions for recording and/or reproduction are prevented. Thus, protection of the optical disc 109 accommodated within the cartridge body 103 is attained.

This disc cartridge 100 is caused to undergo inserting operation into the recording and/or reproduction unit with one side surface perpendicular to the front face where the shutter member 104 is moved being as insertion end. In view of the above, at the upper surface of the cartridge body 103, there is provided an indicating portion 107 indicating the direction in which this disc cartridge 100 is caused to undergo inserting operation into the recording and/or reproduction unit.

In this example, the optical disc 109 accommodated within the cartridge body 103 is of a structure in which the signal recording layer is formed on the principal surface of the disc base (substrate) formed by synthetic resin material having light transmissivity such as polycarbonate resin, etc. Further, at the central portion of the disc base, a center hole into which the center spindle of the recording and/or reproduction unit is engaged is bored, and a hub for magnetic attraction comprised of magnetic material is attached so as to cover this center hole. In this optical disc 109, the non-recording area where no information signal is recorded is formed at the periphery of the center hole, and the signal recording area in which there is provided the recording layer where information signals are recorded is formed at the outer circumferential portion of the non-recording area. In addition, the hub is attached so as to cover the center hole at the central portion of the disc base and in a manner located in the non-recording area.

Meanwhile, in the case of the above-described disc cartridge 100, there is the possibility that also at the time of storage, etc. when it is not loaded with respect to the recording and/or reproduction unit, the shutter member 104 may be caused to undergo movement operation so that the opening portions for recording and/or reproduction are opened. Moreover, when large impact is applied resulting from the fact that the disc cartridge 100 is fallen or damaged, etc., the cartridge body 103 and/or the shutter member 104 may be damaged. When the cartridge body 103 or the shutter member 104 is damaged, there are instances where the disc cartridge 100 cannot be loaded with respect to the recording and/reproduction unit, resulting in the state where it cannot be used. Further, when the cartridge body 103 is damaged, as far as the optical disc 109 accommodated therewithin may be damaged.

In view of the above, the disc cartridge 100 within which the optical disc 109 is accommodated is stored, or is exhibited at the shop in the state further accommodated within an accommodating case.

As an accommodating case adapted for accommodating such disc cartridge 100, an accommodating case constituted as shown in FIG. 1 is used.

The accommodating case 110 shown in FIG. 1 is formed by connecting an upper half 111 formed so as to take a flat plate shape and a lower half 112 in which a rising peripheral wall constituting an accommodating portion 114 of the disc cartridge 100 is formed, the both upper and lower halves 111, 112 being formed so as to have sizes (dimensions) sufficient to accommodate the disc cartridge 100. In addition, an insertion/withdrawal hole 113 for the disc cartridge 100 is provided at the front side. The upper half 111 constituting the accommodating case 110 is formed as a flat plate member to take rectangular shape slightly greater than the outer dimensions of the disc cartridge 100 accommodated as a whole. Further, the upper half 111 is formed by transparent synthetic resin material so as to have ability to carry out visual observation of the disc cartridge 100 from the outside when the disc cartridge 100 is accommodated within the accommodating portion 114. In addition, the lower half 112 constitutes the accommodating portion 114 for accommodating the disc cartridge 100, and is formed so as to have rectangular shape slightly greater than the outer dimensions of the disc cartridge 100 accommodated as a whole.

Further, at the opening end side of the insertion/withdrawal hole 113, in order to facilitate taking-out operation of the disc cartridge 100 accommodated within the accommodating portion 114, there is formed a cut recessed portion 116 for gripping or grasping a portion of the disc cartridge 100 accommodated within the accommodating portion 114. Accordingly, when the disc cartridge 100 is accommodated within the accommodating case 110, a portion thereof is faced toward the external through the cut recessed portion 116.

The disc cartridge 100 is caused to undergo inserting operation in the direction indicated by arrow Z in FIG. 1 through the insertion/withdrawal hole 113 from the insertion end side of the side of one side surface with respect to the accommodating case 110 constituted in this way, whereby the disc cartridge 100 is accommodated into the accommodating portion 114.

On the other hand, the disc cartridge 100 accommodated within the accommodating case 110 can be taken out from the accommodating portion 114 by gripping or grasping, and drawing out the portion faced toward the external from the cut recessed portion 116.

As an accommodating case for accommodating the above-described disc cartridge 100, an accommodating case constituted as shown in FIG. 2 has been further proposed.

The accommodating case 120 shown in FIG. 2 is composed of a case body 121 adapted so that the upper surface side thereof is opened and the opened upper surface side is caused to be an insertion/withdrawal hole 129 of the disc cartridge 100, and a cover body 128 rotatably supported at one side of the case body 121 and adapted for opening or closing the insertion/withdrawal hole 129.

The case body 121 constituting the accommodating case 120 includes a bottom surface portion 122 on which disc cartridge 100 is mounted. A peripheral wall 123 is integrally formed so as to surround, in a channel form, the outer periphery of the bottom surface portion 122, and an accommodating portion 124 of the disc cartridge 100 is constituted within the area surrounded by the peripheral wall 123.

Further, holding portions 125 adapted so that respective corner portions of the disc cartridge 100 accommodated within the accommodating portion 124 are held are provided in a projected manner (hereinafter simply referred to as projected as occasion may demand) on the bottom surface portion 122 of the case body 121. The disc cartridge 100 is accommodated into the accommodating portion 124 in the state where the respective corner portions are held by the holding portions 125, whereby the accommodating position is caused to undergo positioning so that free movement within the accommodating case 120 is limited.

Since the holding portions 125 for holding the respective corner portions of the disc cartridge 100 are provided in a manner positioned at the internal side of the bottom surface portion 122 as shown in FIG. 2, a space is provided between the disc cartridge 100 accommodated within the accommodating portion 124 and the peripherical wall 123. This space is caused to serve as an insertion portion for fingers in accommodating the disc cartridge 100 into the accommodating portion 124, or detaching the disc cartridge 100 accommodated from the holding portions 125.

The cover body 128 rotatably supported at the case body 121 and adapted for opening/closing the insertion/withdrawal hole 129 of the upper surface side is formed so as to have a size (dimensions) sufficient to close the insertion/withdrawal hole 129. Rotational supporting pieces 131 are provided on both sides of the base end portion side, and there is provided a holding portion 132 in a channel form in cross section which is fitted with respect to the back side of the case body 121 in a manner extending between the rotational supporting pieces 131 and adapted so that a portion of printed matter accommodated within the accommodating case 120 is inserted and held.

This cover body 128 is rotatably supported at the case body 121 by allowing support shafts projected on the rotational supporting pieces 131 to be engaged with engagement recessed portions provided at the base end portion side of the peripheral wall 123 of the case body 121.

In order to accommodate the disc cartridge 100 into the accommodating case 120 constituted in this way, the cover body 128 is rotated to open the insertion/withdrawal hole 129 to accommodate the disc cartridge 100 into the accommodating portion 124 through the insertion/withdrawal hole 129 from the upper side of the case body 121 in such a manner that the respective corner portions of the disc cartridge 100 are held by the holding portions 125. Moreover, in order to take out the disc cartridge 100 accommodated within the accommodating case 120, the cover body 128 which has closed the insertion/withdrawal hole 129 is caused to undergo rotational operation to open this insertion/withdrawal hole 129 to release the holding state with respect to the holding portions 125 of the disc cartridge 100 placed in the state accommodated within the accommodating portion 124 in such a manner that the respective corner portions are held by the holding portions 125 to take out the disc cartridge 100 from the insertion/withdrawal hole 129.

However, since the insertion/withdrawal holes 113, 129 respectively provided at the accommodating case 110 shown in FIG. 1 and the accommodating case 120 shown in FIG. 2 described above are adapted to carry out insertion/withdrawal of the disc cartridge 100 only from one direction with respect to the accommodating portions 114, 124, direction of the insertion/withdrawal operation of the disc cartridge 100 is restricted. As a result, it is impossible to carry out insertion/withdrawal operation from desired directions.

Further, in the case of the accommodating case 120 shown in FIG. 2, since the cover body 128 is opened toward the upper side with respect to the case body 121, when the insertion/withdrawal hole 129 is opened, the cover body 128 would be extended above the case body 121, thus making it difficult to carry out insertion/withdrawal of the disc cartridge 100 at a narrow place (space). In addition, since the accommodating case 120 shown in FIG. 2 is adapted to carry out insertion/withdrawal of the disc cartridge 100 in upper and lower directions with respect to the case body 121, and the disc cartridge 100 is accommodated within the accommodating portion 124 in the state held by the holding portions 125 in order to carry out positioning of accommodating position, it is required for taking out the disc cartridge 100 accommodated within the accommodating portion 124 to hold or put this disc cartridge 100 with fingers. For this reason, it is necessary to provide a space for inserting fingers into the portion between the disc cartridge 100 accommodated within the accommodating portion 124 and the peripheral wall 123 of the case body 121. Thus, the accommodating case 120 itself would be large-sized as compared to the disc cartridge 100 to be accommodated therewithin.

In view of the above, in order to permit various directions of insertion/withdrawal of the disc cartridge 100 with respect to the accommodating case to realize miniaturization of the accommodating case itself, an accommodating case constituted as shown in FIG. 3 has been proposed.

The accommodating case 140 shown in FIG. 3 includes a case body 141 in which an accommodating portion 145 for accommodating disc cartridge 100 is constituted, and a cover body 148 for closing the opening portion side of the case body 141.

This case body 141 is caused to be in a form where a pair of side walls 143a, 143b are vertically provided on both sides opposite to each other of a bottom surface portion 142 in a rectangular form, and the front side and the back side perpendicular to these side walls 143a, 143b, and the upper surface side are opened. Further, the cover body 148 is formed so as to have a size (dimensions) sufficient to close the opened upper surface side of the case body 141, and is adapted so that a front wall 147 for closing the opened front side of the case body 141 is provided at the front end side thereof in a manner hanging down. At this cover body 148, rotational supporting pieces 146 are provided on both sides of the base end portion side opposite to the side where the front wall 147 is provided, and a holding portion 147 in a channel form in cross section adapted so that it is fitted with respect to the opened back side of the case body 141 in a manner extending between the rotational supporting pieces 146 and a portion of a printed matter 144 accommodated along the internal surface side of this cover body 148 is inserted and held. In addition, the cover body 148 is rotatably supported at the case body 141 by allowing support shafts projected on the rotational supporting pieces 146 to be engaged with engagement recessed portions provided at end portions of the back sides of the side walls 143a, 143b of the case body 141.

Since the accommodating case 140 constituted in this way is adapted so that since the front side and the upper surface side of the case body 141 are opened, it is possible to carry out insertion/withdrawal of the disc cartridge 100 from the direction extending from the opened front side toward the upper surface side of the case body 141. This eliminates that the direction of insertion/withdrawal of the disc cartridge 100 with respect to the accommodating portion 145 is restricted.

However, because the restriction of the insertion/withdrawal direction of the disc cartridge 100 with respect to the accommodating portion 145 has been eliminated, it becomes difficult to provide, within the accommodating portion 145, means for carrying out positioning of the accommodating position of the disc cartridge 100, with the result that stable accommodating state cannot be obtained. In addition, since insertion/withdrawal from desired directions can be made, there is the possibility that the disc cartridge 100 may be erroneously fallen or dropped at the time of insertion/withdrawal. This fails to realize sufficient (reliable) protection of the disc cartridge 100.

DISCLOSURE OF THE INVENTION

An object of this invention is to provide a novel accommodating case capable of eliminating the problems that accommodating cases as described above have.

Another object of this invention is to provide an accommodating case capable of securely protecting disc cartridge accommodated therewithin and of realizing miniaturization of the accommodating case itself.

A further object of this invention is to provide an accommodating case which is easy to carry out insertion/withdrawal of the disc cartridge, and which prevents falling, etc. at the time of insertion/withdrawal so that insertion/withdrawal can be safely carried out.

A still further object of this invention is to provide an accommodating case which has improved mechanical strength to securely carry out protection of disc cartridge accommodated therewithin.

A still more further object of this invention is to provide an accommodating case which can easily discriminate the insertion direction of disc cartridge accommodated therewithin, which can easily and securely accommodate the disc cartridge at a fixed position, and which can realize reliable protection of disc cartridge accommodated therewithin.

A further different object of this invention is to provide an accommodating case which can efficiently accommodate, along with disc cartridge, printed matter on which information related to information recorded onto (disc-shaped recording medium accommodated within) the disc cartridge is printed.

A still further different object of this invention is to provide an accommodating case which can easily carry out insertion/withdrawal of printed matter accommodated therewithin along with disc cartridge.

An accommodating case for a disc cartridge according to this invention proposed for the purpose of attaining objects as described above comprises: a bottom plate on which the disc cartridge is mounted; a case body including a pair of side walls provided in a manner opposite to each other on both sides of the bottom plate, and adapted so that at least the upper surface side and the front side are opened; and a cover body adapted so that the base end portion side thereof is rotatably supported at the back side of the case body, and fitted between the pair of side walls to close the range or portion at least from the upper surface side toward the front side of the case body. At the inner surface sides opposite to each other of the pair of side walls provided at the case body, there are respectively provided limiting portions for supporting both side edges of the cover body to limit a cover closed position when the cover body is rotated so that it is located at a position where it closes the range or portion from the upper surface side toward the front side of the case body. The disc cartridge accommodated within the accommodating case can be inserted into the case body in a desired insertion direction from the opened portion extending from the upper surface side toward the front side of the case body.

At respective side walls of the cover body, there are provided supporting pieces for supporting printed matter accommodated along the inner surface of the cover body. By providing the supporting pieces for printed matter at the cover body, an accommodating portion for printed matter is constituted at the inner surface of the cover body.

The limiting portion provided at the case body is composed of first and second step portions different in height from the bottom plate, and an inclined surface portion for allowing the first step portion and the second step portion to be continuous. The first and second step portions and the inclined surface portion are such that the first step portion of low height is continuously formed in a length direction of the side wall in a manner positioned at the supporting portion side of the cover body. On the other hand, at both sides opposite to each other of the cover body, side walls supported by the limiting portions are respectively provided. At the front end sides of these side walls, there are respectively provided first and second step portions corresponding to the first and second portions of the limiting portions, and inclined surface portions for allowing the first step portion and the second step portions corresponding to the inclined surface portions of the limiting portions. Since the first and second step portions, and the inclined surface portions for allowing the first and second step portions to be continuous are respectively provided at both the case body and the cover body as described above, smooth rotational operation of the cover body including the side walls and rotatably supported at the case body can be made, and the cover body can be closed in parallel to the case body.

Since supporting portions for supporting the upper surface side of the disc cartridge mounted on the bottom plate and accommodating position limiting portions for limiting the accommodating position in the horizontal direction perpendicular to the thickness direction of the disc cartridge are provided at the case body, the disc cartridge can be accommodated within the case body in the state where it has been held after undergone positioning. In addition, since the disc cartridge is held within the case body, it is possible to prevent the disc cartridge from erroneously falling or slipping off during the opening operation of the cover body.

The cover body includes a top plate and a front wall for covering the portion from the opened upper surface side toward the front side of the case body, and includes a back wall for covering the back side of the case body. The cover body is rotatably attached to the case body in such a manner that the base end portion side where the back wall is provided is supported. In addition, a recess shaped portion corresponding to the locus of rotation of the back wall of the cover body is formed at the bottom plate of the case body. Because the recess shaped portion is provided at the bottom plate of the case body, reliable rotational operation of the cover body including the back wall at the rotational supporting portion side can be realized.

Moreover, since an indicating portion indicating insertion direction of the disc cartridge with respect to the case body is provided at the bottom plate of the case body, inserting operation into the case body of the disc cartridge is facilitated.

Further, at the bottom plate of the case body, an indicating portion indicating accommodating direction of the disc cartridge with respect to the case body is provided. Because this indicating potion is provided, the accommodating direction of the disc cartridge can be easily discriminated.

In addition, since engagement portions to be relatively engaged with each other when the cover body is rotated so that it is located at a position where it closes the case body are provided as engagement means between the cover body and the case body, the case body can be securely closed. Thus, reliable protection of the disc cartridge accommodated therewithin can be realized.

BEST MODE FOR CARRYING OUT THE INVENTION

An accommodating case for a disc cartridge according to this invention will be described below with reference to the attached drawings.

Figure 1:
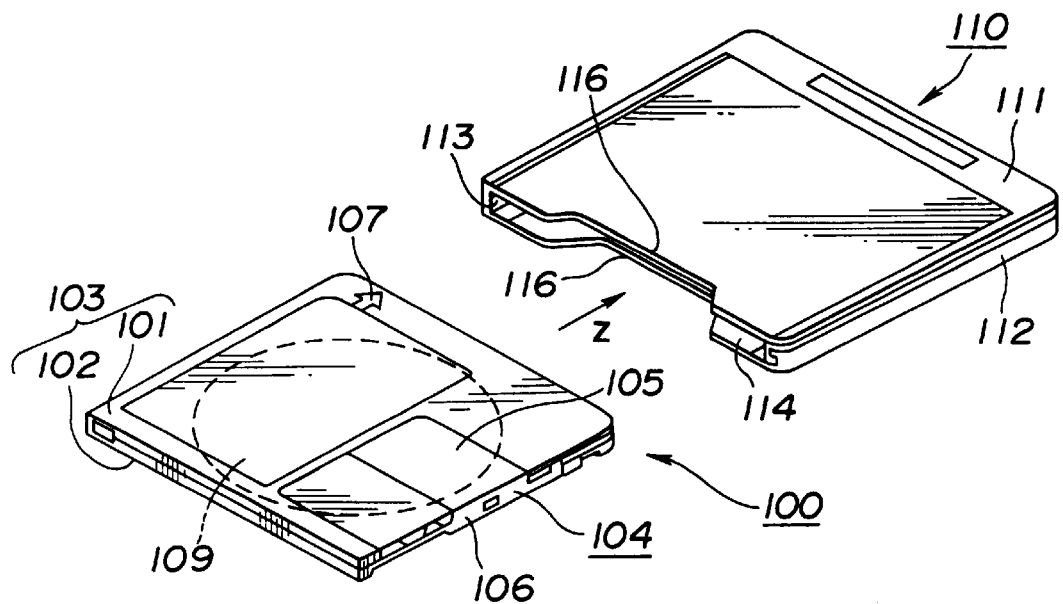
FIG. 1 is a perspective view showing an example of a conventional accommodating case for disc cartridge.
Figure 2:
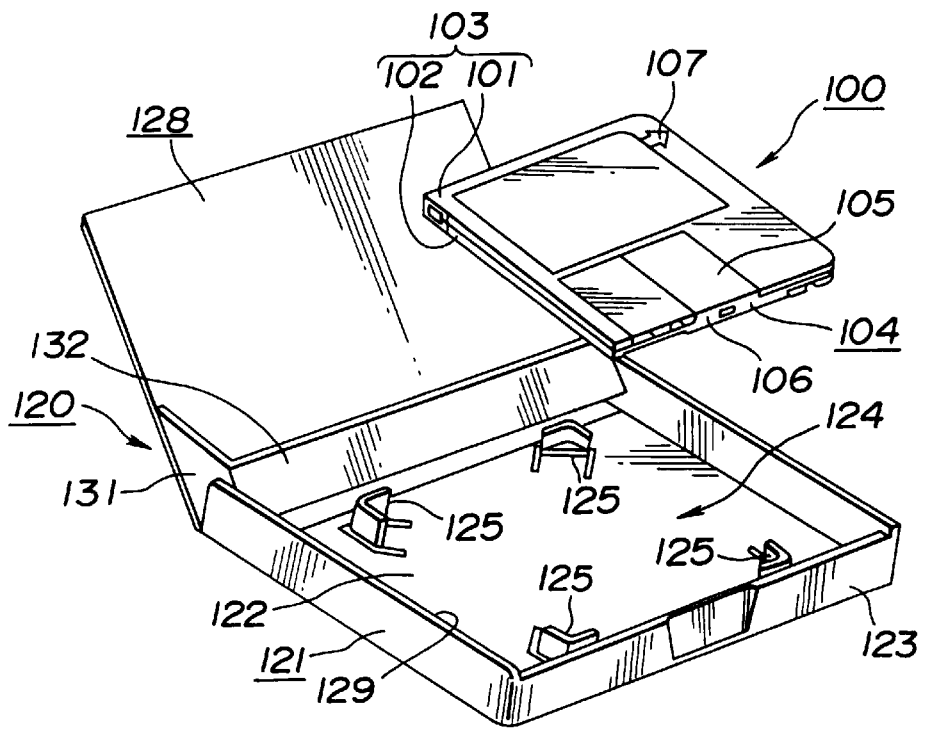
FIG. 2 is a perspective view showing another example of a conventional accommodating case for disc cartridge.
Figure 3:
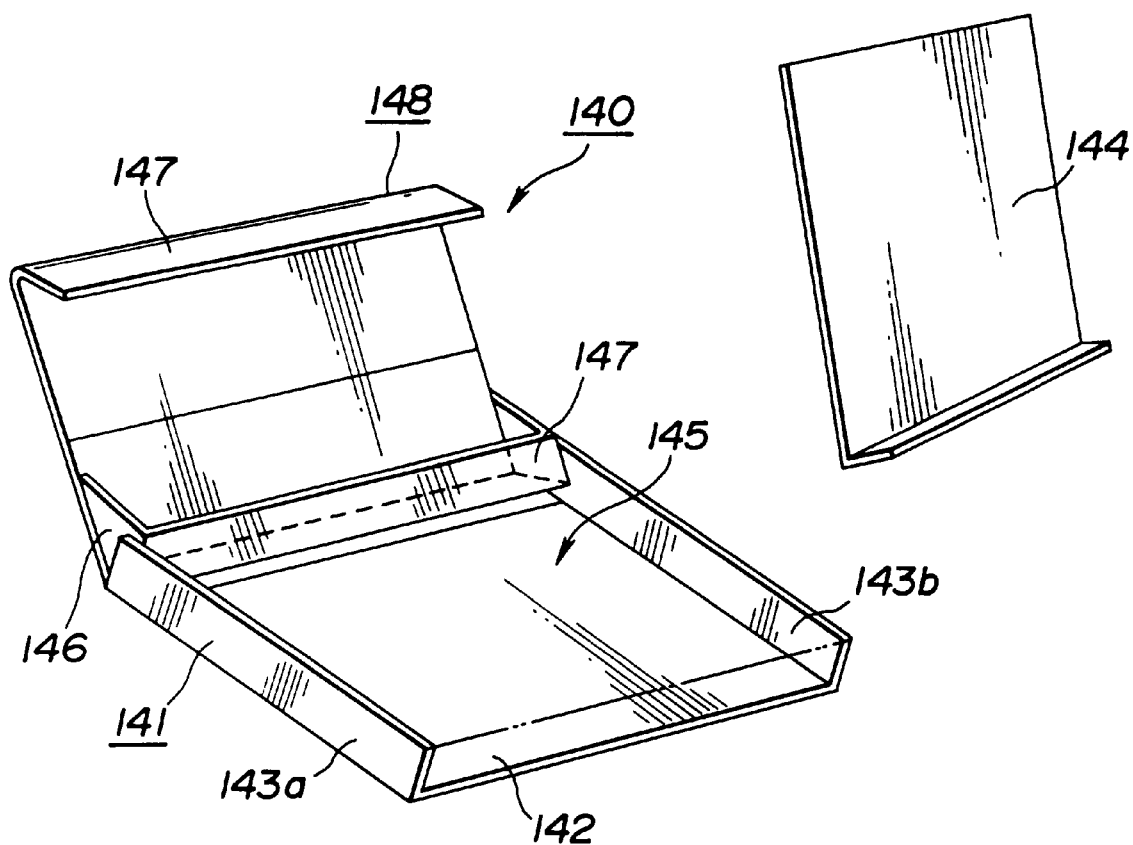
FIG. 3 is a perspective view showing a further example of a conventional accommodating case for disc cartridge.
Figure 4:
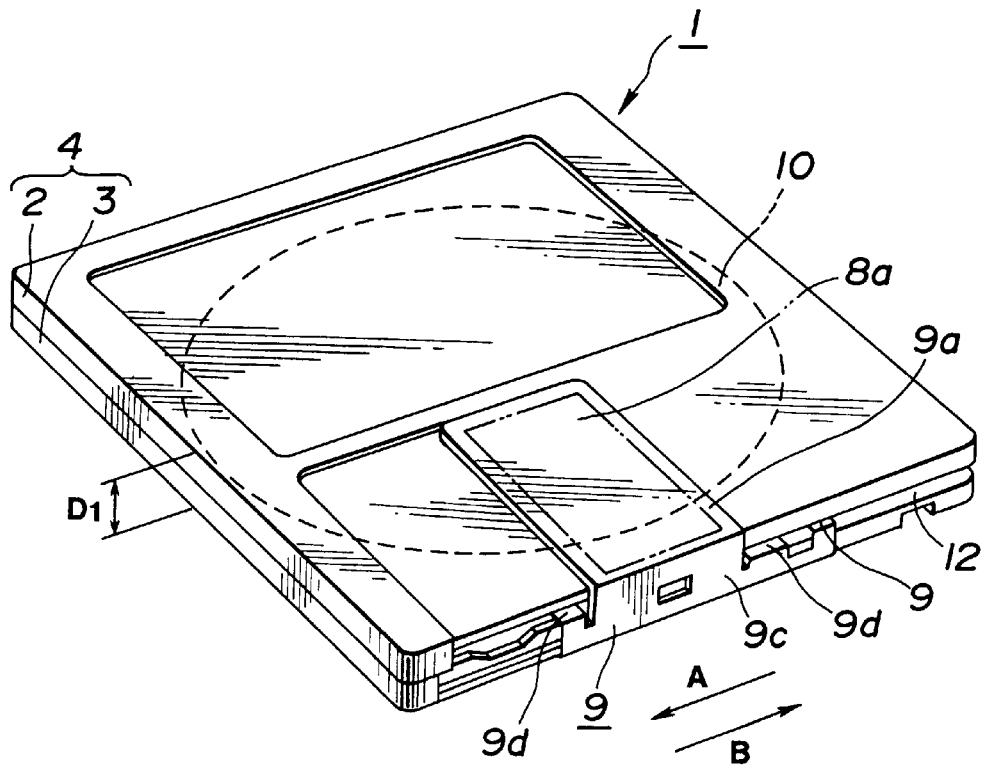
FIG. 4 is a perspective view when a disc cartridge accommodated within an accommodating case according to this invention is viewed from the upper surface side.
Figure 5:
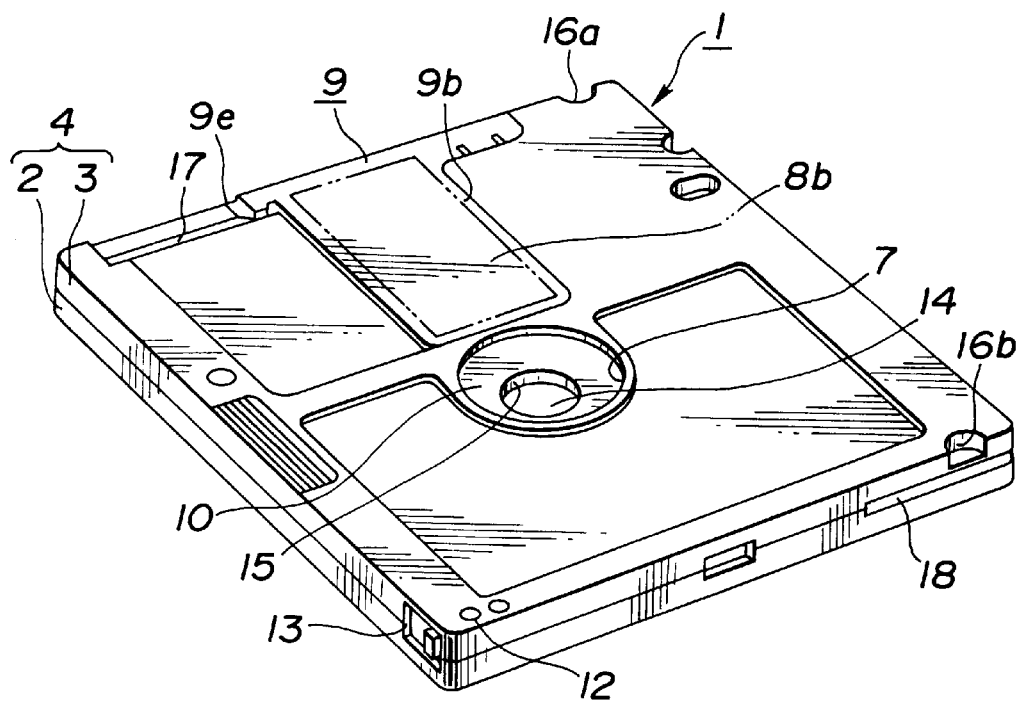
FIG. 5 is a perspective view when the disc cartridge is viewed from the lower surface side.

The accommodating case of this embodiment is adapted to accommodate a disc cartridge 1 constituted as shown in FIGS. 4 and 5 within which an optical disc 10 like magneto-optical disc on which information signals have been recorded, or information signals are to be recorded is accommodated.

The disc cartridge 1 accommodated within the accommodating case of this embodiment comprises, as shown in FIGS. 4 and 5, a cartridge body 4 formed by butt-joining a pair of upper and lower halves 2 and 3 formed so as to take rectangular shape by molding synthetic resin material, and is adapted to rotatably accommodate the optical disc 10 within the cartridge body 4.

The upper and lower halves 2, 3 constitute the cartridge body 4 by bonding by ultrasonic welding, etc. or connecting by fixing screws, butt-joining surfaces of rising walls vertically provided at the outer periphery and butt-joining surfaces of butt-joining projections vertically provided at the inner peripheral sides of the upper and lower halves 2, 3. Within this cartridge body 4, a disc accommodating portion is provided in a manner internally in contact with an outer peripheral wall 5. The optical disc 10 is rotatably accommodated within this disc accommodating portion. The disc accommodating portion is formed by butt-joining circular arc shaped accommodating portion formation walls projected on the inner surfaces opposite to each other of the upper and lower halves 2, 3.

The optical disc 10 accommodated within this disc cartridge 1 is of a structure in which a signal recording layer is formed on the principal surface of disc base (substrate) molded by synthetic resin material having light transmissivity such as polycarbonate resin, etc. A reflection film such as aluminum, etc. is formed on the signal recording layer, and a protective film of the same material as the disc base is further formed thereon. Further, at the central portion of the disc base, a center hole 15 with which center spindle of the recording and/or reproduction unit side is engaged is bored, and a hub 14 for magnetic attraction comprised of magnetic material is attached in a manner to cover this center hole 15. In this optical disc 10, a non-recording area where no information signal is recorded is formed at the periphery of the center hole 15, and a signal recording area in which there is provided a recording layer where information signals are recorded is formed at the outer circumferential portion of the non-recording area. In addition, the hub 14 is attached at the central portion of the disc base and in a manner positioned in the non-recording area so as to close the center hole 15.

Further, at the central portion of the bottom surface side of the cartridge body 4, as shown in FIG. 5, there is provided a central opening portion 7 into which disc table which is a portion of the disc rotational operation mechanism of the recording and/or reproduction unit side for rotationally operating the optical disc 10 accommodated within this cartridge body 4 is admitted. The central portion including the center hole 15 of the optical disc 10 accommodated within the cartridge body 4 is faced to this central opening portion 7.

Further, at the cartridge body 4, there are opened opening portions 8a, 8b for recording and/or reproduction in a manner positioned substantially at the central portion in left and right directions extending from the central portion toward the front side at the upper and lower surfaces. The optical disc 10 accommodated within the cartridge body 4 is adapted so that a portion of the signal recording area is faced to the external of the cartridge body 4 extending in the radial direction through the opening portions 8a, 8b.

Further, at the front side of the cartridge body 4, a shutter member 9 for opening/closing the opening portions 8a, 8b for recording and/or reproduction is attached so that it can be moved. This shutter member 9 is formed by punching and bending thin metal plate, and is composed of a pair of shutter portions 9a, 9b having sizes (dimensions) sufficient to respectively close the opening portions 8a, 8b for recording and/or reproduction, and a connecting portion 9c for connecting these shutter portions 9a, 9b. Thus, the shutter member 9 is formed so as take substantially channel shape in cross section as a whole. The shutter member 9 is attached to the cartridge body 4 so that it can be moved in the direction indicated by arrow A and in the direction indicated by arrow B in FIG. 4 in the state where a movement guide piece 9d formed by turning back a portion of the connecting piece 9c is inserted into a movement guide groove 12 formed at the front side of the cartridge body 4, and the other movement guide piece 9e formed by turning back a portion of the connecting piece 9c is engaged with a guide groove 17 formed at the lower surface side of the cartridge body 4.

The shutter member 9 is adapted so that when the disc cartridge 1 is loaded with respect to the recording and/or reproduction unit, it is caused to undergo movement operation in the direction indicated by arrow A in FIG. 4 by shutter movement operation member provided at the recording and/or reproduction unit side, which is admitted into the movement guide groove 12 formed at the front side of the cartridge body 4, to open the opening portions 8a, 8b for recording and/or reproduction, and at the time of non-use such as storage, etc. when the disc cartridge 1 is not loaded with respect to the recording and/or reproduction unit, it is caused to undergo movement operation in the direction indicated by arrow B in FIG. 4 from the position where it opens the opening portions 8a, 8b, and is thus held at the position where it closes the opening portions 8a, 8b for recording and/or reproduction.

Moreover, at the back side opposite to the front side where the shutter member 9 is moved of the cartridge body 4, an engagement groove 18 with which insertion direction limiting piece provided at the recording and/or reproduction unit side is engaged is formed in a manner extending toward the middle portion of the insertion end side into the recording and/or reproduction unit. Further, at the lower surface side of the cartridge body 4 and in a manner positioned at the insertion end side into the recording and/or reproduction unit and positioned at the front side and the back side, there are provided engagement recessed portions 16a, 16b with which a portion of the loading mechanism provided at the recording and/or reproduction unit side is engaged.

The disc cartridge 1 constituted as described above is inserted into the recording and/or reproduction unit with one side surface side perpendicular to the front side where the shutter member 9 is attached being as the insertion end. Namely, this disc cartridge 1 is loaded with respect to the recording and/or reproduction unit with movement direction of the shutter member 9 being as the insertion direction.

Figure 6:
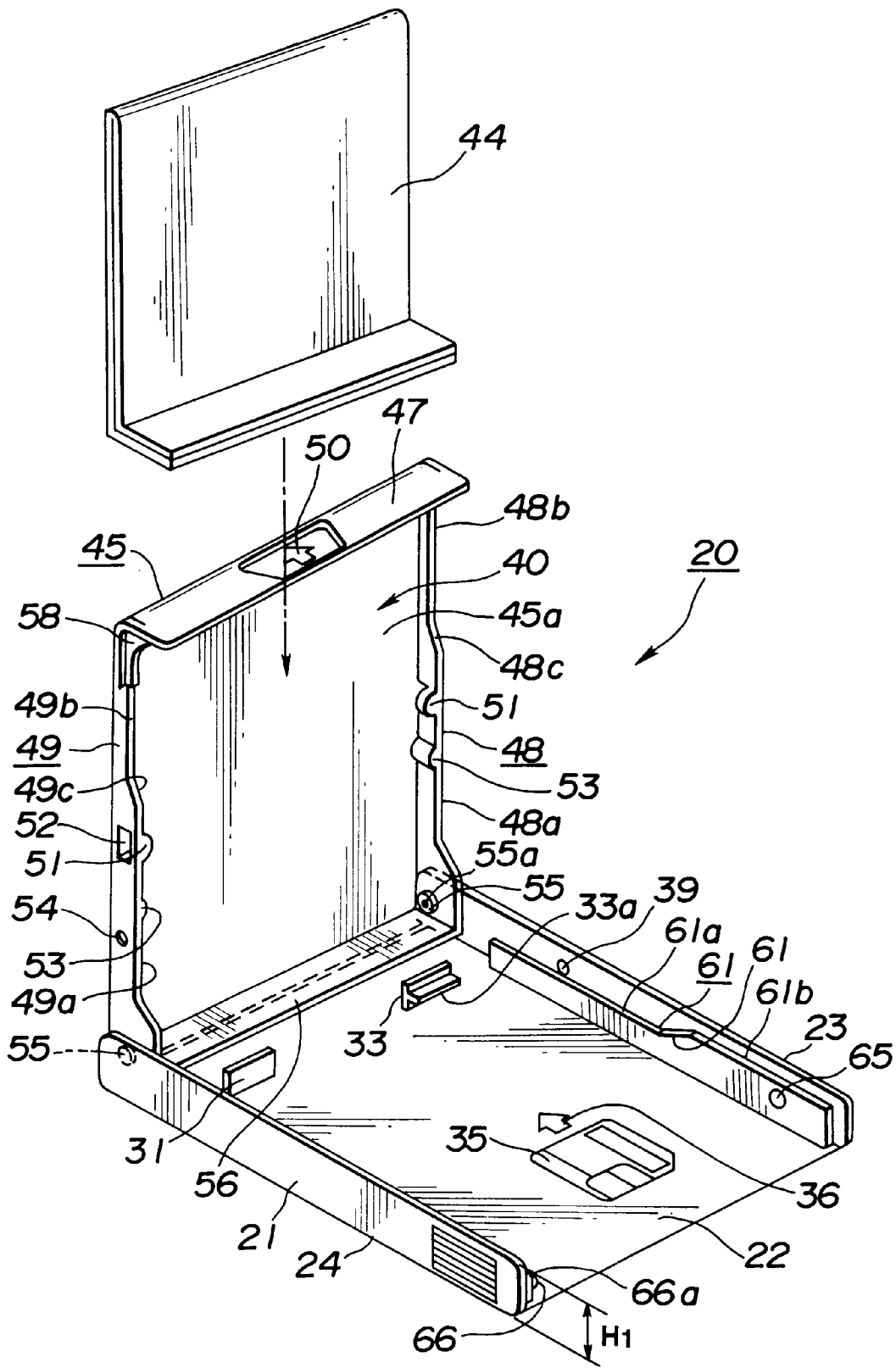
FIG. 6 is a perspective view showing the accommodating case according to this invention in the state where cover body is opened.
Figure 7:
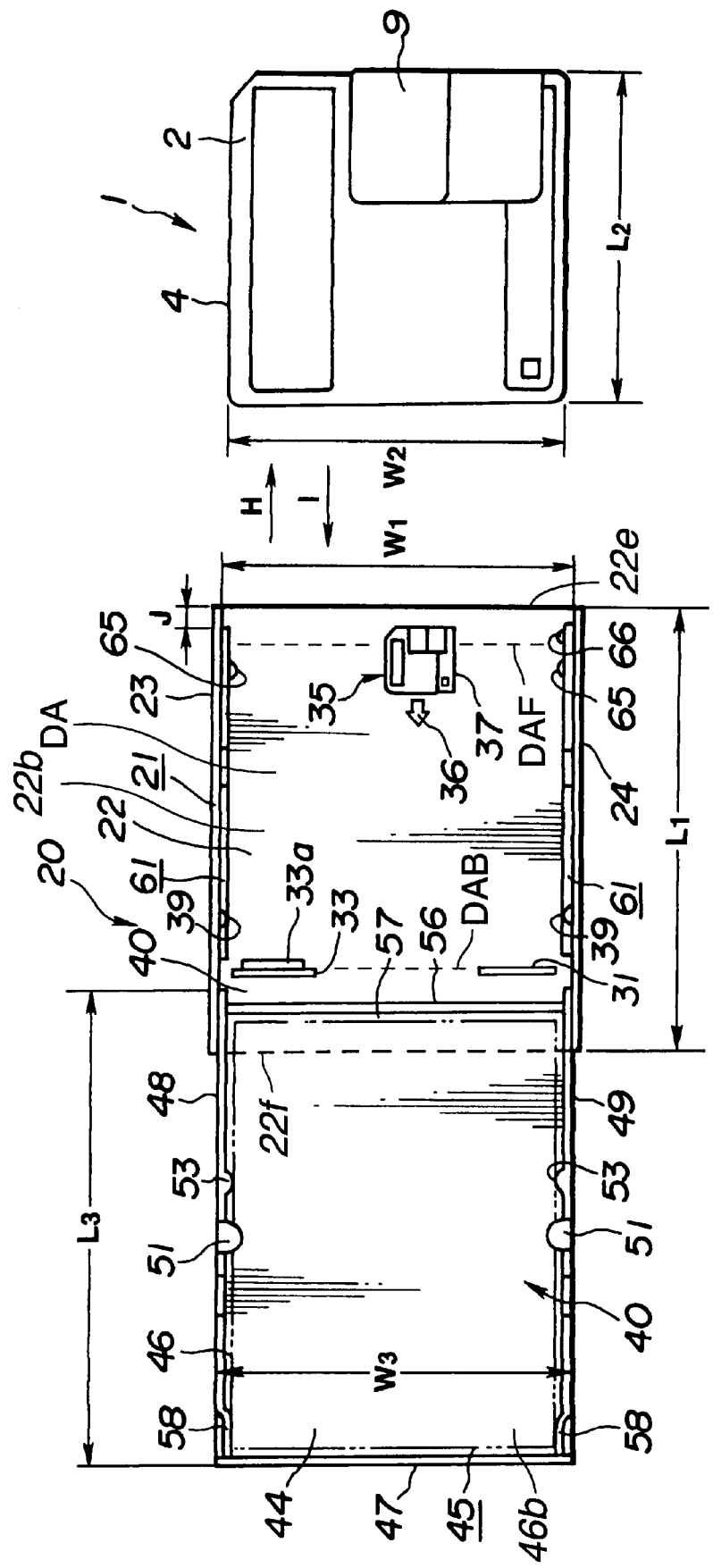
FIG. 7 is a plan view of the accommodating case in the state where the cover body is opened.

An accommodating case 20 according to this invention within which the disc cartridge 1 constituted as described above is accommodated is composed, as shown in FIGS. 6 and 7, of a case body 21 constituting the accommodating portion for the disc cartridge 1, and a cover body 45 for closing the opened portion of this case body 21. The case body 21 and the cover body 45 are formed by molding synthetic resin material. In this embodiment, the cover body 45 is formed by using transparent synthetic resin material.

The case body 21 constituting this accommodating case 20 is adapted so that a pair of side walls 23, 24 are formed in a rising manner (hereinafter simply referred to as rising-formed as occasion may demand) in a manner opposite to each other on both sides of the bottom plate 22 constituting the mounting surface of the disc cartridge 1, and is formed so as to take a shape such that the front side and the back side perpendicular to the both sides where these side walls 23, 24 are provided are opened, and the upper surface side is opened. The side walls 23, 24 provided at the case body 21 are formed so as to have height $H_1$ slightly higher than thickness $D_1$ of the disc cartridge 1 accommodated within this accommodating case 20. In addition, the respective side walls 23, 24 function as a limiting portion for limiting movement in the width direction of the disc cartridge 1 mounted on the bottom plate 22.

Further, the bottom plate 22 of the case body 21 is formed as shown in FIG. 7 so as to take a rectangular shape such that width $W_1$ between the pair of side walls 23, 24 is caused to be substantially equal to width $W_2$ of the front side and the back side where the shutter member 9 is moved of the disc cartridge 1 accommodated within the accommodating case 20, and that length $L_1$ in a length direction extending from the opened front side toward the back side is caused to be longer than length $L_2$ of the side surface perpendicular to the front portion where the shutter member 9 is moved of the disc cartridge 1.

Figure 15:
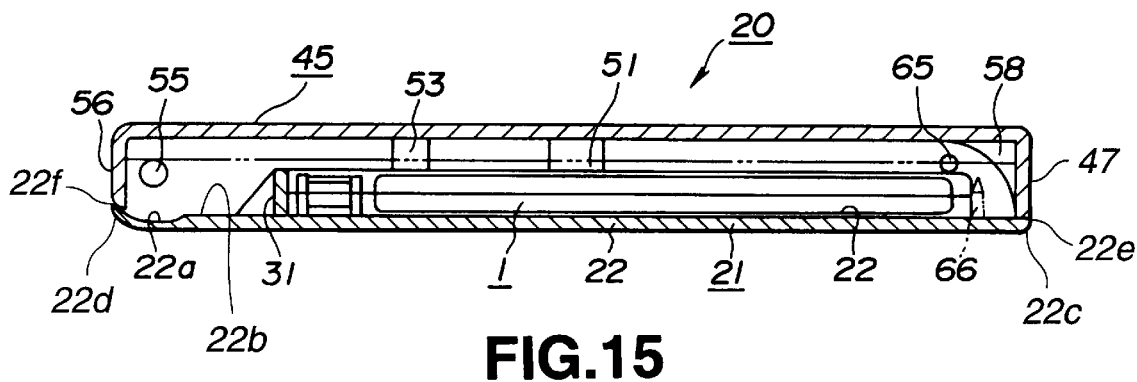
FIG. 15 is a cross sectional view of the accommodating case showing the state where the disc cartridge has been accommodated.

In addition, as shown in FIG. 15, the bottom plate 22 of the case body 21 has a top surface 22b, a front sidewall surface 22c, a back sidewall surface 22d, a front edge 22e defined where the top surface 22b meets the front sidewall surface 22c, and a back edge 22f defined where the top surface 22b meets the back sidewall surface 22d.

As shown in FIG. 6, the case body 21 caused to be of a structure in which the side walls 23, 24 are formed only on both sides of the bottom plate 22 as described above is adapted so that the range extending from the upper surface side toward the front side is opened, and this opened portion is caused to serve as a portion for permitting insertion/withdrawal of the disc cartridge 1.

Moreover, as shown in FIG. 6, the cover body 45 rotatably attached to the case body 21 and adapted for covering the opened area extending from the back side toward the front side of the case body 21 serves to close the opened area of the case body 21 in such a manner that it is fitted between the side walls 23, 24 opposite to each other of the case body 21. Namely, as shown in FIG. 7, the cover body 45 is formed so as to have a rectangular shape having a width $W_3$ substantially equal to the width $W_1$ between the side walls 23, 24 of the case body 21, and having a length $L_3$ substantially equal to the length $L_1$ of the case body 21. Further, at both sides opposite to each other of the cover body 45, a pair of side walls 48, 49 are integrally formed in a manner handing down therefrom. Further, at the front end side of the cover body 45, there is integrally formed a front wall 47 for closing the opened portion of the front side of the case body 21 when accommodating case 21 is closed. At the base end portion side, there is integrally formed a back wall 56 for closing the opened portion of the back side of the case body 21. The front wall 47 and the back wall 56 respectively connect the front side and the back side between the pair of side walls 48, 49. Namely, the cover body 45 is formed so as to take a rectangular shallow box shape as a whole as the result of the fact that the pair of side walls 48, 49, the front wall 47 and the back wall 56 are provided at the outer periphery.

On the surface of the front wall 47 of the cover body 45, there is provided a cover opening direction indicating portion 50 indicating the cover opening direction of this cover body 45. This indicating portion 50 is provided by marking arrow indicating the cover opening direction of the cover body 45. The indicating portion 50 is formed simultaneously with molding of the cover body 45 by providing auxiliary metal mold for molding the indicating portion 50 at the metal mold for molding this cover body 45 in molding the cover body 45. In order to facilitate discrimination, fluossecent painting (coating) material or other coloring matter (agent) is painted (coated) on the indicating portion 50 formed by marking. In addition, in the case of this indicating portion 50, since indication is implemented by forming uneven portions at the surface of the front wall 47 of the cover body 45, this indicating portion 50 can be used as a finger holding portion in carrying out opening operation of the cover body 45 when accommodating case 21 is closed. Thus, reliable opening operation of the cover body 45 can be carried out.

Further, the cover body 45 is rotatably attached to the case body 21 with support shafts 55, 55 projected on the inner side surfaces at the position of the back sides of the side walls 23, 24 of the case body 21 being as the center in the state where the support shafts 55, 55 are pivotally supported through penetration holes 55a, 55a bored at the base end portion sides of the side walls 48, 49.

Figure 8:
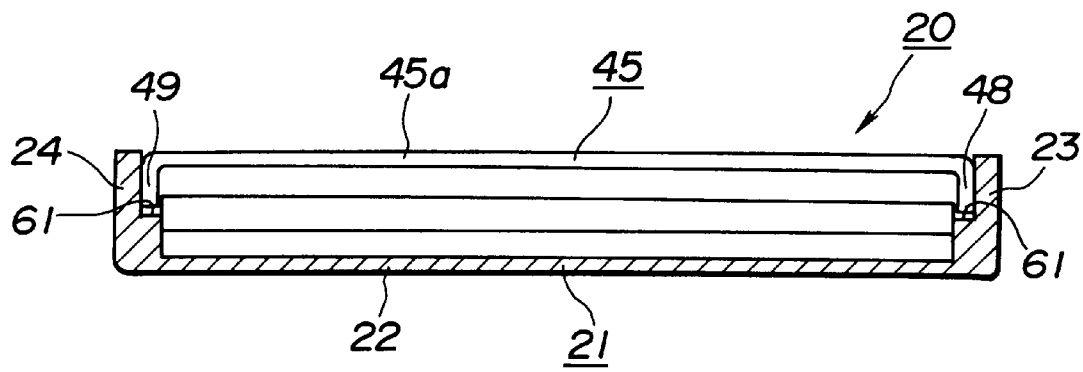
FIG. 8 is a lateral cross sectional view of the accommodating case in the state where the cover body is closed (covered).

Further, at the inside surfaces of the side walls 23, 24 of the case body 21, as shown in FIG. 6, there are integrally formed, in the length direction, limiting portions 61 for limiting the cover closing position with respect to the accommodating case 21 of the cover body 45 when the cover body 45 is caused to undergo cover closing operation with respect to the case body 21. As shown in FIG. 8, these limiting portions 61 serve so that when accommodating case 21 is closed, the front end edges of the side walls 48, 49 of the cover body 45 are supported in the state caused to collide thereagainst to thereby limit the cover closing position so that this cover body 45 is closed in the state caused to be in parallel to the bottom plate 22 of the case body 21, and are respectively composed of first step portions 61a in which height from the bottom plate 22 is low, second step portions 61b in which height from the bottom plate 22 is high, and inclined surface portions 61c for allowing the respective first and second step portions 61a, 61b to be continuous. The first step portions 61a, the second step portions 61b and the inclined surface portions 61c are continuously extending in the length direction of the side walls 23, 24, respectively. In addition, the first step portion 61a low in height of the limiting portion 61 is formed so as to have a height substantially equal to or slightly greater than the thickness $D_1$ of the disc cartridge 1 accommodated within this accommodating case 20.

On the other hand, the cover body 45 is adapted so that when the front end edges of the side walls 48, 49 are caused to collide against the limiting portions 61, cover closing position is limited so as to cover the case body 21 in the state caused to be in parallel to the bottom plate 22 of the case body 21. Accordingly, as shown in FIG. 6, at the side walls 48, 49 of the cover body 45, there are respectively provided first step portions 48a, 49a, second step portions 48b, 49b, and inclined surface portions 48c, 49c corresponding to the first step portions 61a, the second step portions 61b and the inclined surface portions 61c of the limiting portions 61. Namely, the first step portions 48a, 49a and the second step portions 48b, 49b provided at the side walls 48, 49 side of the cover body 45 are formed so that heights from a top plate 46a of the cover body 45 have the relationship opposite to that of heights of the first step portion 61a and the second step portion 61b of the limiting portion 61, and are formed so that the first step portions 48a, 49a are caused to be high and the second step portions 48b, 49b are caused to be low. In addition, top plate 46a has a bottom side 46b.

As shown in FIG. 8, the cover body 45 covers the case body 21 in such a manner to allow the front end sides of the side walls 48, 49 to collide against the limiting portions 61, 61, and to allow them to be fitted between the side walls 23, 24 of the case body 21. Accordingly, even if such a force to deform the cover body 45 is applied, the cover body 45 is prevented from being easily deformed, and the case body 21 can be caused to be securely kept in the cover closed state. Thus, reliable protection of the disc cartridge 1 accommodated therewithin can be realized.

Further, the limiting portions 61, 61 are provided extending over substantially entire length of the side walls 23, 24 of the case body 21, whereby the side walls 48, 49 of the cover body 45 are supported by the limiting portions 61, 61 extending over substantially entire length. Thus, deformation of the cover body 45 can be more reliably prevented.

Meanwhile, since the cover body 45 is adapted so that the wall is provided in a manner to surround four sides and the base end portion side is rotatably supported at the case body 21 through the support shafts 55, the cover body 45 is caused to be in parallel to the bottom plate 22 to cover the case body 21. For this reason, the limiting portions 61 are provided so that the respective first step portions 61a of low height are positioned at the support shaft 55 side. In addition, the inclined surface portion 61c for allowing the first step portion 61a and the second step portion 61b of the limiting portion 61 to be continuous is formed at an inclined angle substantially along the locus of rotation of the cover body 45 rotating with the support shafts 55 being as the center.

Moreover, at inside surfaces of the side walls 23, 24 of the case body 21, there are projected engagement projections 39 relatively engaged with engagement recessed portions 54 provided at the outside surfaces of the side walls 48, 49 of the cover body 45 when accommodating case 21 is closed. Since the cover body 45 is adapted so that when it covers the case body 21, the cover closing position is held as the result of the fact that the engagement projections 39 are respectively engaged with the engagement recessed portions 54, easy opening operation is limited to prevent falling or slipping off of the disc cartridge 1 accommodated therewithin. Thus, reliable protection can be made.

Further, as shown in FIG. 6, there are provided a first limiting piece 33 and a second limiting piece 31 which are adapted for supporting the disc cartridge 1 accommodated within this case body 21 in a manner projected from the bottom plate 22 in the state positioned at the back side of the case body 21 to limit the accommodating position with respect to the case body 21 of this disc cartridge 1. The first limiting piece 33 is provided in a manner positioned at one side wall 23 side of the case body 21, and the second limiting piece 31 is provided in a manner positioned at the other side wall 24 side of the case body 21.

The direction in which the disc cartridge 1 is accommodated within the accommodating case 20 will now be described. The disc cartridge 1 is accommodated so that the front side where the shutter member 9 is attached is positioned at the front side of the case body 21. When the disc cartridge 1 is accommodated in this way, the engagement groove 18 provided at the back side is positioned at one side wall 23 side of the case body 21, and the flat plane surface of the back (face) side is positioned at the other side wall 24 side of the case body 21.

Figure 9:
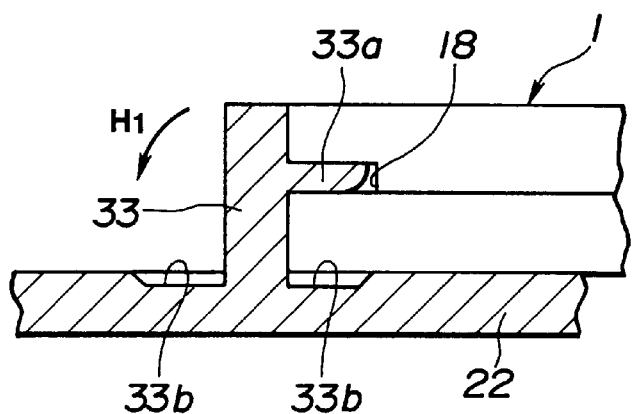
FIG. 9 is a cross sectional view showing the state where engagement projection of first limiting piece is engaged with engagement groove of the disc cartridge.

In view of the above, the second limiting piece 31 provided at the other side wall 24 side of the case body 21 is formed so as to take a flat plate shape such that the surface side opposite to the disc cartridge 1 accommodated therewithin is caused to be a flat surface in a manner to support the flat surface of the back side of the disc cartridge 1. On the other hand, at the first limiting piece 33 provided at one side wall 24 side of the case body 21, as shown in FIG. 9, an engagement projection 33a engaged with the engaged groove 18 is projected at the surface side opposite to the disc cartridge 1 accommodated within this case body 21.

In this case, the gap (space) between the first limiting piece 33 and the second limiting piece 31 is caused to serve as a finger holding portion when the disc cartridge 1 accommodated within the case body 21 is taken out.

Moreover, the first and second limiting pieces 33, 31 are provided at the position close to the internal side from the back side of the bottom plate 22. The area between the first and second limiting pieces 33, 31 and the back side on the bottom plate 22 is caused to be the area where the back wall 56 of the cover body 45 rotatably supported by the case body 21 rotates.

Further, at the inner side surfaces of the respective side walls 23, 24 of the case body 21, there are projected supporting projections 65, 65 for supporting the upper surface side of the disc cartridge 1 accommodated within this case body 21. These supporting projections 65, 65 serve to prevent the disc cartridge 1 accommodated within the case body 21 in the state mounted on the bottom plate 22 from falling or slipping off from the opened upper side of the case body 21. The respective supporting projections 65, 65 are projected on the inside surfaces of the front sides of the respective side walls 23, 24 so as to have ability to support the upper surface of the front side where the shutter member 9 is attached of the disc cartridge 1 accommodated within the case body 21. The respective supporting projections 65, 65 are formed so as to take substantially semi-spherical shape in which the circumferential surface is formed to take circular arc shape in order to facilitate insertion/withdrawal of the disc cartridge 1.

Further, at the inner side surface of the other side wall 24 of the case body 21, as shown in FIG. 7, there is provided a projected portion 66 serving as a supporting portion for supporting the front side where the shutter member 9 is attached of the disc cartridge 1 accommodated within the case body 21. This projected portion 66 is formed in a manner continuous in the height direction of the other side wall 24, wherein an inclined surface 66a is formed at the front end side thereof. This inclined surface 66a serves as a guide portion for guiding the disc cartridge 1 toward the accommodating position side when the disc cartridge 1 is caused to be accommodated within the case body 21 in the state mounted on the bottom plate 22.

In addition, as further shown in FIG. 7, a disc accommodation region DA is defined on the top side 22b of the bottom plate 22 between the front and back edges 22e and 22f and the first and second sidewalls 23 and 24. The disc accommodation region DA has a minimum area equal to an area of the disc cartridge 1, a front and DAF that is spaced apart from the front edge 22e of the bottom plate 22, and a back and DAB that is spaced apart from the back edge 22f of the bottom plate 22.

It is to be noted that there may be employed a configuration in which projected portions 66 for supporting the front side of the disc cartridge 1 are respectively provided at internal surfaces of the side walls 23, 24 opposite to each other to support the front side of the disc cartridge 1 by these two projected portions 66.

Figure 10:
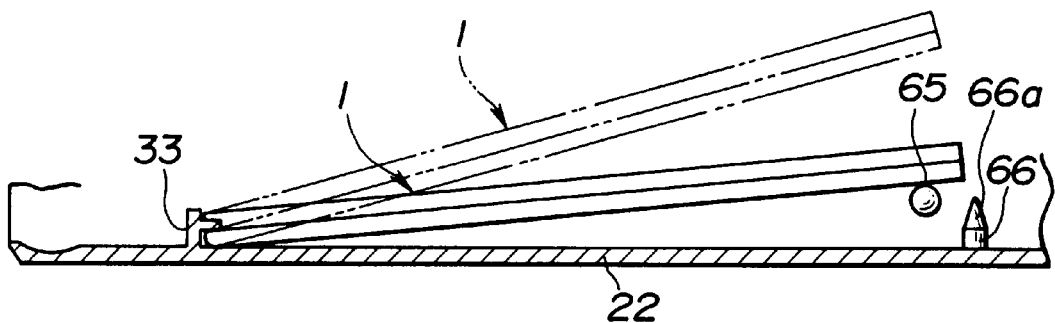
FIG. 10 is a cross sectional view showing the state where the disc cartridge is to be accommodated into case body.
Figure 11:
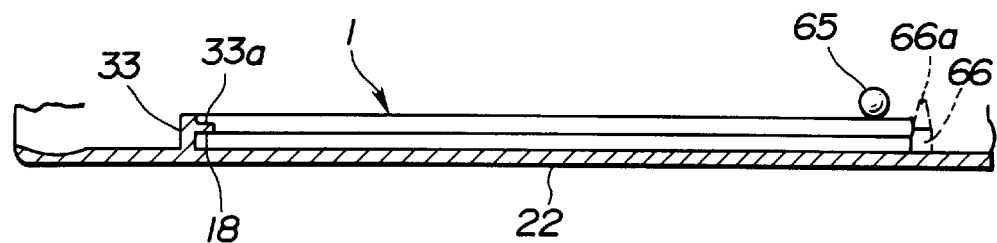
FIG. 11 is a cross sectional view showing the state where the disc cartridge has been accommodated into the case body.

In order to accommodate the disc cartridge 1 into the case body 21 constituted as described above, the disc cartridge 1 is inserted obliquely with respect to the case body 21 from the opened upper side of the case body 21 with the back side opposite to the front side where the shutter member 9 is attached being as the insertion end. At this time, the back side of the disc cartridge 1 is caused to collide against the first and second limiting pieces 33, 31 to allow the engagement projection 33a of the first limiting pieces 33 to be engaged with the engagement groove 18 provided at the back side of the disc cartridge 1 as shown in FIG. 10. Then, the disc cartridge 1 obliquely inserted into the case body 21 is rotated toward the bottom plate 22 side in such a manner that the first and second limiting pieces 33, 31 are caused to be fulcrum of rotation. When the disc cartridge 1 is rotated toward the bottom plate 22 side, the side surface of the disc cartridge 1 comes into contact with supporting projections 65, 65 projected on the inside surfaces of the side walls 23, 24 of the case body 21 to run or ride across the supporting projections 65, 65 while allowing these side walls 23, 24 to be bent toward the external so as to widen the interval (spacing) between the respective side walls 23, 24. At this time, the front portion of the disc cartridge 1 is supported by the projected portion 66 while being guided by the inclined surface 66a. Further, when the disc cartridge 1 is mounted on the bottom plate 22, this disc cartridge 1 is accommodated into the case body 21 in the state where it is prevented from slipping off toward the upper direction of the case body 21 by the engagement projection 33a of the first limiting piece 33 engaged with the engagement groove 18 and the supporting projections 65, 65 for supporting the upper surface of the disc cartridge 1, and movement in the horizontal direction of the direction perpendicular to the thickness direction is limited by the first and second limiting pieces 33, 31 which have supported the back of the disc cartridge 1 and the projected portion 66 which has supported the front side of the disc cartridge 1.

As stated above, since the case body 21 of the accommodating case 20 according to this invention is adapted to support the disc cartridge 1 mounted on the bottom plate 22 by the first and second limiting pieces 33, 31 and the projected portion 66 so that it is caused in a horizontal direction to limit the accommodating position, and to support the upper surface side of the disc cartridge 1 by the engagement projection 33a of the first limiting piece 33 and the supporting projections 65, 65, it is possible to prevent slipping off from the case body 21 of the disc cartridge 1 even in the state when accommodating case 21 is not closed.

Meanwhile, since the supporting projections 65, 65 for supporting the upper surface of the disc cartridge 1 mounted on the bottom plate 22 of the case body 21 are adapted so that when the disc cartridge 1 is caused to undergo insertion/withdrawal with respect to the case body 21, the side surface of the disc cartridge 1 runs or rides thereacross, it is desirable to form the front end surface to take circular arc shape for the purpose of realizing smooth insertion/withdrawal. In addition, since the supporting projections 65, 65 are integrally formed on the side walls 23, 24 of the case body 21 formed by molding synthetic resin material, they are formed at a height for permitting release of the metal mold for molding the side walls 23, 24.

Further, since the projected portion 66 for supporting the front portion of the disc cartridge 1 mounted on the bottom plate 22 of the case body 21 is adapted so that when the disc cartridge 1 is caused to undergo insertion/withdrawal with respect to the case body 21, the front portion of the disc cartridge 1 also runs or rides thereacross, it is desirable to form the peripheral surface to take circular arc shape in order to realize smooth insertion/withdrawal. In addition, since the projected portion 66 is integrally formed on the side wall 24 of the case body 21 formed by molding synthetic resin material, it is formed so as to have a diameter for permitting release of the metal mold for molding the side wall 24.

While explanation has been given in connection with the state where the disc cartridge 1 is inserted obliquely from the upper direction with respect to the case body 21 and is thus accommodated therewithin, bending deformation of the side walls 23, 24 formed by synthetic resin may be utilized to insert the disc cartridge 1 from the opened front side of the case body 21 along the bottom plate 21 to accommodate it therewithin.

In this case, the disc cartridge 1 is accommodated into the case body 21 in such a manner that the side surface thereof runs or rides across the projected portion 66 in the state where the side walls 23, 24 opposite to each other of the case body 21 are bent in such a manner that they are widened.

Meanwhile, in carrying out insertion/withdrawal of the disc cartridge 1 toward the upper direction of the case body 21, the disc cartridge 1 is rotated with the portion in contact with the first and second limiting pieces 33, 31 being as fulcrum. In the case of detaching the disc cartridge 1 toward the upper direction of the case body 21 in this way, it is desirable for carrying out smooth insertion/withdrawal of the disc cartridge 1 that the first limiting piece 33 provided with the engagement projection 33a engaged with the engagement groove 18 is caused to undergo bending deformation in the direction indicated by arrow $H_1$ in FIG. 9 in accordance with rotational direction of the disc cartridge 1. Namely, the engagement projection 33a is detached from the engagement groove 18 in the middle of taking-out operation of the disc cartridge 1, whereby smooth detachment operation can be carried out.

In view of the above, in order to permit easy bending deformation of the first limiting piece 33 provided with the engagement projection 33a engaged with the engagement groove 18 of the disc cartridge 1, recessed portions 33b are formed at the periphery of the bottom portion of the first limiting wall 33 in such a manner that a portion of the bottom plate 22 is caused to be thin in thickness as shown in FIG. 9. Since the recessed portions 33b are provided at the base portion of the first limiting piece 33 as stated above, the first limiting piece 33 is permitted to be elongated. Thus, easy deformation can be made. In addition, since the recessed portions 33b are provided at the bottom plate 22 of the case body 21, release of the auxiliary metal mold for molding the first limiting piece 33 assembled into the metal mold for molding of the case body 21 can be facilitated.

It is to be noted that, in order to carry out positioning of the accommodating position of the disc cartridge 1 accommodated within the case body 21, it is sufficient to support one portion of the upper surface side of the disc cartridge 1 accommodated within the accommodating case 21 and respective one portions of the front side and the back side. Accordingly, as the limiting piece for supporting the back side of the disc cartridge 1, it is sufficient to provide only either one of the first and second limiting pieces 33, 31.

Moreover, as means for supporting the front side of the disc cartridge 1 accommodated within the accommodating case 21, projection in semi-spherical form similar to the supporting projection 65 may be used in place of the projected portion 66.

Further, in the case where the engagement projection 33a is not provided at the first limiting piece 33, it is sufficient that recessed portions 33b are not provided at the base portion side. Namely, this is because the first limiting piece 33 is formed so as to have thin thickness resulting from the fact that engagement projection 33a is not provided at the middle portion, whereby the first limiting piece 33 can be caused to easily undergo displacement.

Further, at the base plate 22 of the case body 21, as shown in FIGS. 6 and 7, there are provided a first indicating portion 35 indicating the accommodating direction of the disc cartridge 1 with respect to the case body 21, and a second indicating portion 36 indicating the insertion direction thereof. The first indicating portion 35 indicating the accommodating direction is constituted by indication formed by marking corresponding to the plane shape of the disc cartridge 1 accommodated. In addition, the second indicating portion 36 indicating the insertion direction is constituted by arrow formed by marking to designate direction of insertion of the disc cartridge 1.

As stated above, the first and second indicating portions 35, 36 are provided, thereby making it possible to easily discriminate the accommodating direction and the insertion direction. Thus, it is possible to precisely and quickly carry out the accommodating operation.

Meanwhile, the first indicating portion 35 and the second indicating portion 36 are formed simultaneously with molding of the accommodating case 21 by providing the auxiliary metal mold for molding the first indicating portion 35 in association with the metal mold for molding this accommodating case 21 in molding the case body 21. In addition, fluorescent painting (coating) material or other coloring matter is painted on the first and second indicating portions 35, 36 formed by marking in order to facilitate discrimination by visual observation.

It is to be noted that the first and second indicating portions 35, 36 may be formed by implementing printing to the surface of the bottom plate 22, or sticking sheet body to which indication is implemented.

The first indicating portion 35 is adapted to be suitably changed in correspondence with appearance of the disc cartridge 1 accommodated. Moreover, as the second indicating portion 36, any marking indicating the insertion direction with respect to the case body 21 of the disc cartridge 1 may be used without being limited to arrow.

At the inner surface side of the cover body 45 rotatably attached to the case body 21 within which the disc cartridge 1 is accommodated and adapted for closing the range the from the opened upper surface side toward the front side of the case body, there is provided a printed matter accommodating portion 40 for accommodating printed matter such as pamphlet or card, etc. on which caption (title) and/or words of music, etc. which are the content of information recorded on the disc cartridge 1 accommodated within this accommodating case 20 are printed.

This printed matter accommodating portion 40 is constituted with a space encompassed by the front wall 47, the back wall 56 and the both side walls 48, 49 of the cover body 45.

Further, at the front end sides of the central portions of the both side walls 48, 49, as shown in FIG. 6, there are projected, toward the internal direction, supporting pieces 51, 51 for supporting both sides of the printed matter 44 accommodated within the printed matter accommodating portion 40 along the inner surface of the top plate 46a to prevent falling off from the accommodating portion 40. Since the printed matter 44 accommodated within the printed matter accommodating portion 40 is adapted so that since both sides thereof are supported by these supporting pieces 51, 51 also when the cover body 45 is uncovered or opened, it is possible to independently carry out insertion/withdrawal operation of the disc cartridge 1 and insertion/withdrawal operation of the printed matter 44 with respect to the accommodating case 20.

In this example, the supporting pieces 51, 51 are provided at positions corresponding to the first step portions 48a, 49a in contact with the first step portions 61a of the accommodating case 21 side of the side walls 48, 49. Since the first step portions 61a formed at the accommodating case 21 are formed to have a height substantially equal to the disc cartridge 1 accommodated therewithin, the supporting pieces 51, 51 provided at the front end sides of the first step portions 48a, 49a of the cover body 45 respectively in contact with the first step portions 61a function as a supporting piece for supporting the upper surface of the disc cartridge 1 accommodated within the case body 21.

Meanwhile, the supporting pieces 51, 51 are formed by the metal mold unit simultaneously with molding of the cover body 45. In order to mold these supporting pieces 51, 51, pattern draw holes 52 of the metal mold are respectively formed at the side walls 48, 49. The provision of such pattern draw holes 52 results in the possibility that dust may be admitted into the case body 21. In the accommodating case 20 according to this invention, since the side walls 48, 49 of the cover body 45 are engaged with the insides of the side walls 23, 24 of the case body 21 in the state when accommodating case 21 is closed, the pattern draw holes 52 are closed by the side walls 23, 24 of the case body 21, thus making it possible to prevent admission of dust, etc. into the case body 21.

Moreover, at the internal surface sides of the side walls 48, 49 of the cover body 45 and in a manner positioned in the vicinity of the holding projections 51, 51, there are provided supporting projections 53, 53 semicircular shaped in cross section for supporting both sides of the printed matter 44 accommodated within the printed matter accommodating portion 40. Further, at the internal surface of the front end side continuously connecting to the front wall 47 of the side walls 48, 49, there are provided supporting portions 58, 58 for supporting the both sides of the printed matter 44 accommodated within the printed matter accommodating portion 40. The supporting projections 53, 53 and the supporting portions 58, 58 serve to carry out positioning of the accommodating position in the width direction of the printed matter 44 accommodated within the accommodating portion 40, and provide a space between the side edge of the printed matter 40 and the side walls 48, 49, thus facilitating insertion/withdrawal operation of the accommodated printed matter 44.

The supporting projections 53, 53 are formed so that each height projected toward the internal direction is caused to be height equal to the thickness of the supporting portions 58, 58. Accordingly, in the case where the printed matter 44 is accommodated within the accommodating portion 40 of this cover body 45, the printed matter 44 can be accommodated in parallel to the cover body 45 without producing positional shift in the state supported by the supporting projections 53, 53 and the supporting portions 58, 58.

Figure 12:
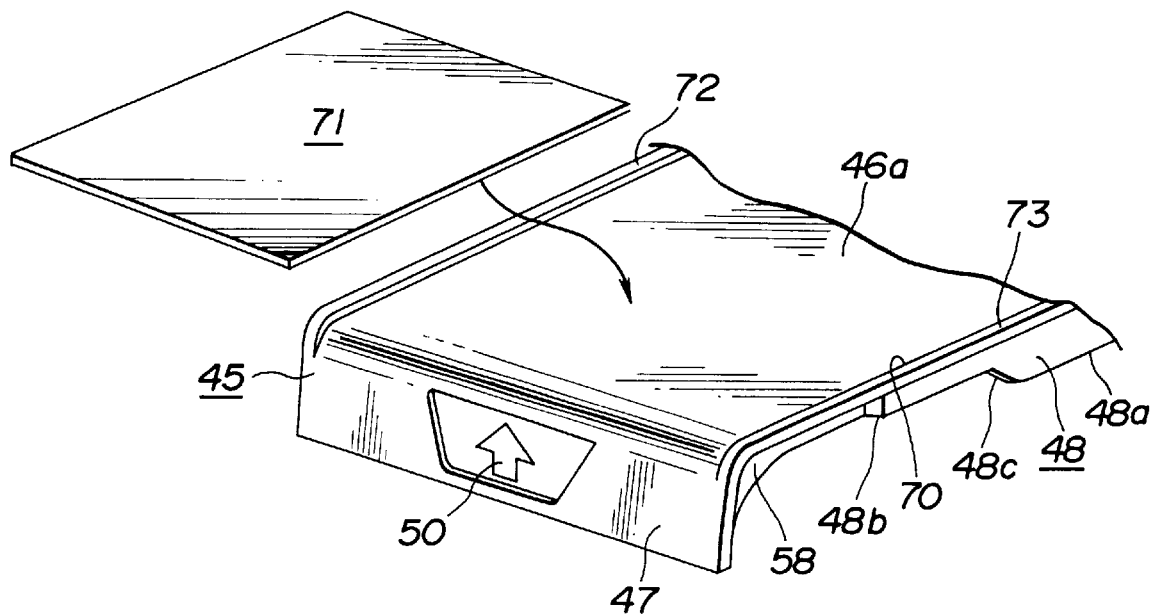
FIG. 12 is a perspective view showing the surface side of the cover body.

Moreover, at the surface side of the cover body 45, as shown in FIG. 12, there is provided a label sticking portion 70 on which an indicating label 71 indicating caption (title) or the content, etc. of information recorded on (disc-shaped recording medium accommodated within) the disc cartridge 1 accommodated within this accommodating case 20 is stuck. This label sticking portion 70 is constituted by projecting projected portions 72, 73 on both sides of the top plate 46a of the cover body 45. These projected portions 72, 73 are used as guide for carrying out positioning of the sticking position of the indicating label 71.

Further, the corner portion of the front wall 47 side of the cover body 45 is formed by curve. Thus, the indicating label 71 can be stuck in a manner gradually curved. Namely, the indicating label 71 can be stuck more beautifully.

Further, as the result of the fact that the projected portions 72, 73 are provided on the surface of the cover body 45, it can be prevented that damage takes place at the portion encompassed by these projected portions 72, 73. Particularly, fine flaw such as scratch or abrasion, etc. is apt to take place on the surface of the cover body 45 because the cover body 45 is formed by synthetic resin material, but such a flaw is effectively prevented, thus making it possible to maintain beauty appearance for a long time.

Because the projected portions 72, 73 are provided on the both sides, the cover body 45 can guarantee sufficient strength even if the plate thickness is caused to be thin. As a result, the weight of the entirety of the accommodating case 20 can be caused to be light.

Meanwhile, as the result of the fact that the pair of side walls 48, 49, the front wall 47 and the back wall 56 are provided on the outer periphery of the cover body 45 as shown in FIG. 6, the cover body 45 is formed as a thin box-shaped body to take rectangular shape as a whole. This cover body 45 is rotatably attached by allowing both sides of the base end portion side where the back wall 56 is provided to be pivotally supported by the case body 21. Further, the back wall 56 of the cover body 45 is formed so as to have height substantially equal to those of the side walls 23, 24 of the case body 21 in which the support shafts 55 for pivotally supporting the cover body 45 are provided in a manner to cover the opened back side of the case body 21. For this reason, when the cover body 45 is caused to undergo rotational operation in the state attached to the case body 21, the back wall 56 would come into contact with the bottom plate 22 of the case body 21. In view of the above, there is formed a recessed portion 22a so that the front end of the back wall 56 does not interfere with the bottom plate 22 when the cover body 45 is rotated with the support shafts 55 being as the center within the range from the position where it closes the case body 21 indicated by solid line in FIG. 13 to the position where it opens the case body 21 indicated by single dotted lines in FIG. 13. Since this recess shaped portion 22a serves to guarantee smooth rotation of the cover body 45, it is desirable to form the recess shaped portion 22a so as to take recess curved shape curved along the rotational locus of the back wall 56.

Further, at the lower end edge of the back wall 56, there is provided an inclined surface portion 56a in correspondence with shape in which the recess shaped portion 22a of the bottom plate 22 of the case body 21 gradually curves toward the internal of the case body 21. By providing the inclined surface portion 56a in this way, when the cover body 45 is caused to be in cover closed state, the lower end edge of the back wall 56 is admitted into the recess shaped portion 22a. Further, the boundary between the back wall 56 and the case body 21 is covered by a projected portion 22b projected toward the cover body 45 side of the end portion of the recess shaped portion 22a. As a result, gap taking place in the vicinity of this boundary is permitted not to become conspicuous. Thus, appearance as the accommodating case 20 can become satisfactory.

It is to be noted that the inclined surface portion 56a may be linearly inclined, or may be inclined in a manner curved.

Figure 13:
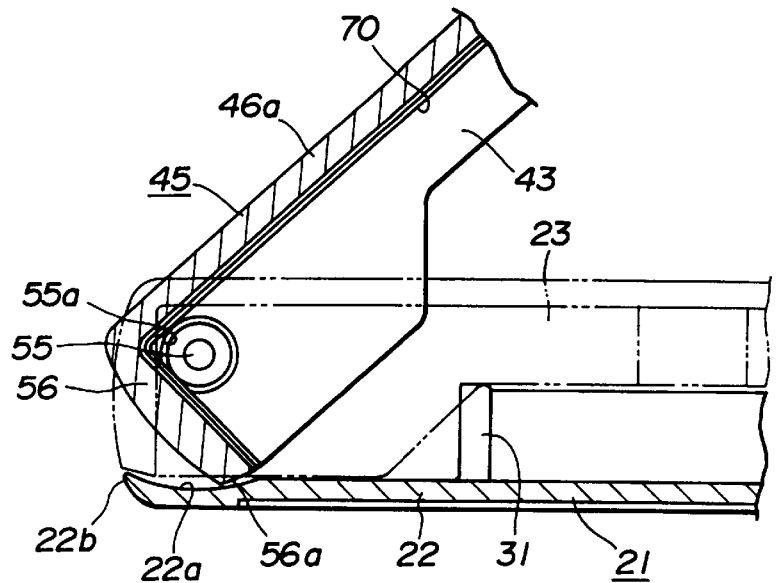
FIG. 13 is a cross sectional view showing supporting portion for supporting the cover body at the case body.

Further, by providing the recess shaped portion 22a at the bottom plate 22 of the case body 21, in such cases that the printed matter 44 is accommodated within the printed matter accommodating portion 40 along the back wall 56 in the state where a portion of the printed matter 44 is turned back as shown in FIG. 13, interference with the front end bottom plate 22 of the turned back printed matter 44 can be securely prevented. Thus, it can be prevented that the printed matter 44 constitutes obstruction to opening/closing of the cover body 45.

Further, since the pair of side walls 48, 49, the front wall 47 and the back wall 56 provided on the cover body 45 are formed in a manner perpendicular to the top plate 46a, the configuration of the metal mold for molding the cover body 45 is simplified. As a result, not only molding is facilitated, but also appearance can be formed beautifully.

The state where the disc cartridge 1 is accommodated into the accommodating case 20 constituted as described above will now be described.

Figure 14:
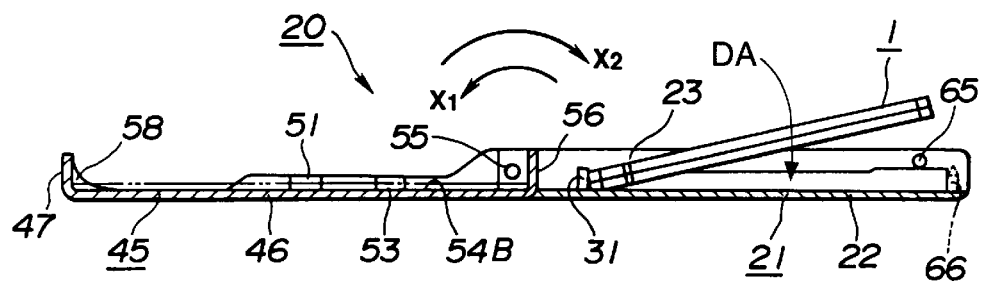
FIG. 14 is a longitudinal cross sectional view of the accommodating case showing the state where the disc cartridge is to be accommodated.

In order to accommodate the disc cartridge 1, the cover body 45 is rotated in the direction indicated by arrow $X_1$ in FIG. 14 with the support shafts 55 being as the center to open the case body 21. Then, the disc cartridge 1 is obliquely inserted with respect to the case body 21, with the back side opposite to the front side where the shutter member 9 is attached being as the insertion end, from the opened upper surface side of the case body 21. At this time, the back side of the disc cartridge 1 is caused to collide against the first and second limiting pieces 33, 31 to allow the engagement projection 33a of the first limiting piece 33 to be engaged with the engagement groove 18 provided at the back side of the disc cartridge 1 as previously described. The disc cartridge 1 obliquely inserted into the case body 21 is rotated toward the bottom plate 22 side in such a manner that the side of the first and second limiting pieces 33, 31 is as fulcrum of rotation. When the disc cartridge 22 is rotated toward the bottom plate 22 side, the side surface of the disc cartridge 1 comes into contact with the supporting projections 65, 65 projected on the inside surface of the side walls 23, 24 of the case body 21 to run or ride across the supporting projections 65, 65 while externally bending these side walls 23, 24 in a manner to widen the interval (spacing) between the respective side walls 23, 24. Then, the disc cartridge 1 is mounted on the bottom plate 22. At this time, as shown in FIG. 15, the disc cartridge 1 is accommodated into the case body 21 in the state where it is caused to undergo prevention of slipping off toward the upper direction of the case body 21 by the engagement projection 33a of the first limiting piece 33 engaged with the engagement groove 18 and the supporting projections 65, 65 for supporting the upper surface of the disc cartridge 1, and movement in before and after directions is limited by the first and second limiting pieces 33, 31 which have supported the back of the disc cartridge 1 and the projected portion 66 which has supported the front side of the disc cartridge 1.

After the disc cartridge 1 is accommodated into the case body 21, the cover body 45 is rotated in the direction indicated by arrow $X_2$ in FIG. 14 with the support shafts 55 being as the center so as to close the case body 21. Thus, the case body 21 is covered or closed in such a manner that the cover body 45 is fitted between the respective side walls 23, 24 of the case body 21. When the cover body 45 is covered or closed, the upper surface side of the disc cartridge 1 is supported by the supporting pieces 51, 51 for supporting the both sides of the printed matter 44 accommodated within the printed matter accommodating portion 40 provided at the cover body 45 as shown in FIG. 15. As the result of the fact that the upper surface side of the disc cartridge 1 is supported by the supporting pieces 51, 51, the accommodating position in the height direction within the accommodating case 20 is securely limited. Thus, the disc cartridge 1 is accommodated therewithin in a stable state.

On the other hand, at the cover body 45 of the accommodating case 20, the printed matter 44 on which recording content, etc. of the disc cartridge 1 is printed is accommodated into the printed matter accommodating portion 40 in the state supported by the supporting pieces 51, 51. Accordingly, the printed matter 44 may be also accommodated at the same time (as occasion demand) within the accommodating case 20 along with the disc cartridge 1. In this case, since the printed matter 44 is accommodated in the state where it is supported by the supporting projections 53, 53 and the supporting portions 58, 58 (in addition to supporting by the supporting pieces 51, 51) so that the accommodating position is limited, it can be efficiently accommodated into the accommodating case 20 along with the disc cartridge 1.

Moreover, in order to take out the disc cartridge 1 accommodated within the accommodating case 20, finger is held or put on the front wall 47 to rotate the cover body 45 in the direction indicated by arrow $X_1$ in FIG. 14 with the support shafts 55 being as the center to open the case body 21. Then, finger is inserted into the portion between the first and second limiting pieces 33, 31 within the case body 21 to draw upwardly the disc cartridge 1 from the case body 21. As a result, the engagement projection 33a of the first limiting piece 33 is detached from the engagement groove 18, and supporting by the supporting projections 65, 65 is released. Thus, taking-out operation from the accommodating case 20 of the disc cartridge 1 is carried out.

Since the accommodating case 20 according to this invention can carry out insertion/withdrawal of the disc cartridge 1 from the upper side and the front side of the case body 21 as described above, insertion/withdrawal operation is facilitated. Moreover, since the accommodating case 20 is permitted to undergo insertion/withdrawal also by allowing the disc cartridge 1 to undergo slide operation with respect to the case body 21, insertion/withdrawal at a narrow place (space) can be facilitated. In addition, since the accommodating case 20 is adapted so that only the side where the cover body 45 is supported is caused to be larger than the disc cartridge 1 accommodated therewithin, miniaturization can be provided as a whole.

Further, since respective walls of the cover body 45 are formed so as to have flat plate shape, not only molding is easy, but also appearance can be satisfactorily finished. In addition, by molding the cover body 45 with transparent synthetic resin, the printed matter 44 accommodated therewithin is permitted to see through the cover body 45. As a result, the content implemented to the printed matter 44 can be caused to undergo visual observation from the outside. Thus, the content of the disc cartridge 1 accommodated can be easily discriminated.

Figure 16:
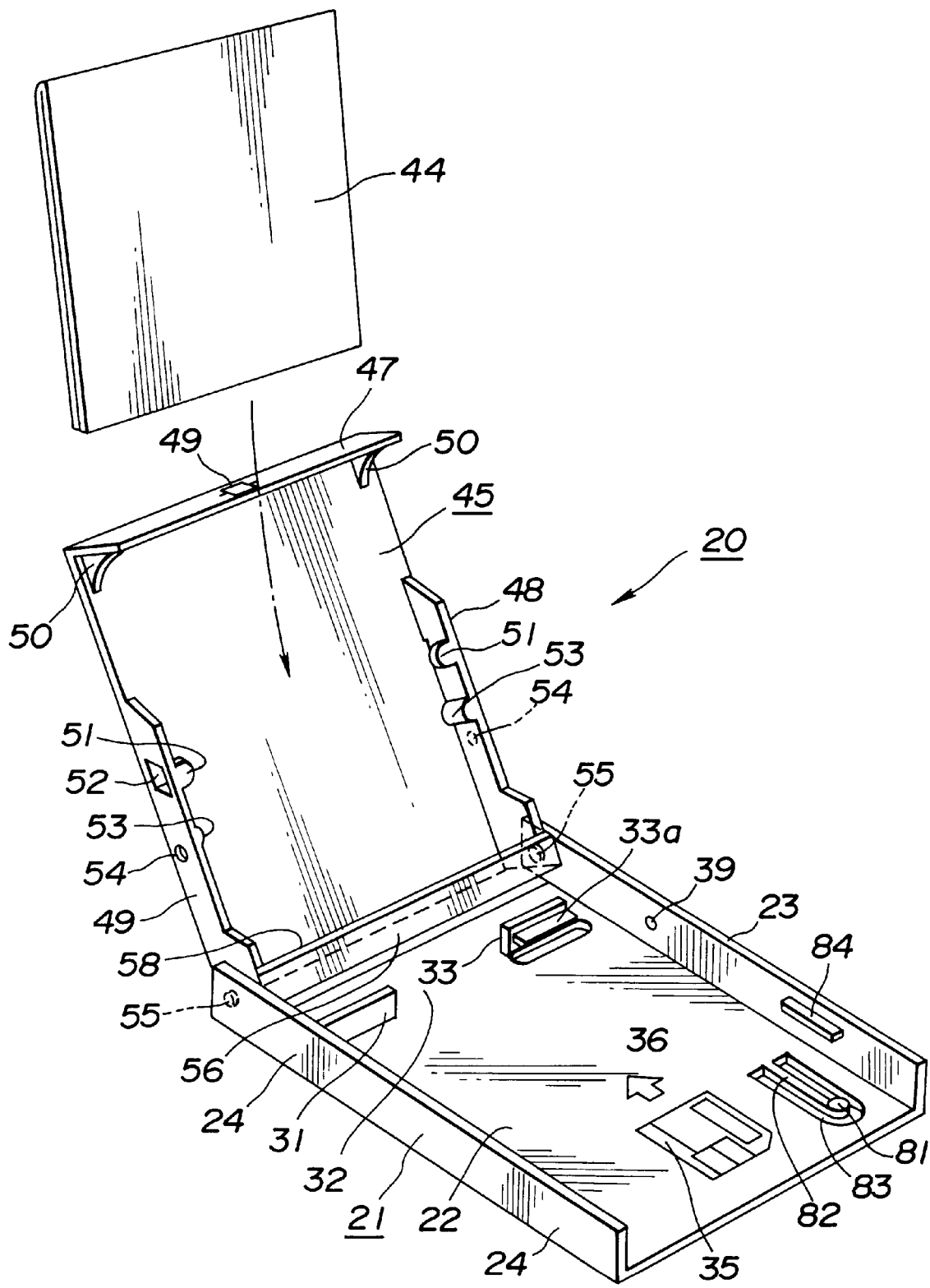
FIG. 16 is a perspective view showing another embodiment of the accommodating case according to this invention.

While the above-described accommodating case 20 is adapted to carry out positioning of the accommodating position in a manner to press and support the outer circumferential surface of the disc cartridge 1, and to allow a portion of the limiting piece to be engaged with the engagement groove 18, there may be provided, as shown in FIG. 16, a mechanism engaged with the engagement recessed portion 16a with which a portion of the loading mechanism provided at the disc cartridge 1 is engaged to carry out positioning of the accommodating position with respect to the case body 21.

At an accommodating case 220 shown in the FIG. 16 mentioned above, an engagement piece 82 in which an engagement projection 81 engaged with the engagement recessed portion 16a of disc cartridge 1 is formed is provided at bottom plate 22 of case body 21. This engagement piece 82 is formed by providing a substantially U-shaped cut portion 83 at the bottom plate 22, and is caused to undergo elastic displacement in the thickness direction of the bottom plate 22 with the connecting portion side to the bottom plate 22 being as fulcrum. The engagement piece 81 is adapted so that when the disc cartridge 1 is mounted on the bottom plate 22, the engagement projection 81 is subjected to elastic displacement toward the lower surface side of the bottom plate 22 as the result of the fact that the engagement projection 81 is pressed by the disc cartridge 1, and is subjected to elastic returning as the result of the fact that the disc cartridge 1 is mounted at the accommodating position on the bottom plate 22 to allow the engagement projection 81 to be engaged with the engagement recessed portion 16a, thus to carry out positioning of accommodating position with respect to the case body 21 of the disc cartridge 1. Moreover, a supporting portion 84 for supporting the upper surface side of the disc cartridge 1 provided at one side wall 23 of the case body 21 is provided in a manner positioned in the vicinity of the engagement piece 82 as shown in FIG. 16. By providing the supporting piece 84 for supporting the upper surface of the disc cartridge 1 in the vicinity of the engagement piece 82 in this way, floating of the disc cartridge 1 is prevented, thus making it possible to securely engage the engagement projection 81 with the engagement recessed portion 16a.

In this case, the supporting portion 84 is formed as a projected portion in which the length direction of the side wall 23 is caused to be the length direction. In addition, at the front end side of the supporting portion 84, an inclined surface is provided for the purpose of facilitating insertion/withdrawal of the disc cartridge 1.

The accommodating case 220 shown in FIG. 16 is adapted to carry out positioning in before and after directions with respect to the case body 21 of the disc cartridge 1 by first and second limiting pieces 33, 31, and the engagement projection 81 of the engagement piece 82 engaged with the engagement recessed portion 16a. Because the accommodating position of the disc cartridge 1 is caused to undergo positioning by such a supporting structure, projected portion 66 for supporting the front side of the disc cartridge 1 as in the case of the previously described accommodating case 20 becomes unnecessary.

It is to be noted that, in the accommodating case 220 shown in FIG. 16, common reference numerals are attached to portions common to those of the previously described accommodating case 20, and the detailed explanation will be omitted.

The accommodating case according to this invention is not limited to an accommodating case for accommodating the disc cartridge within which the optical disc is accommodated, but may be applied to an accommodating case for accommodating disc-shaped recording medium such as magnetic disc, etc. except for the optical disc. In addition, the first indicating portion 35 indicating the accommodating direction of the disc cartridge provided on the bottom plate 22 may be suitably changed in correspondence with the form of disc cartridge accommodated.

Industrial Applicability

As described above, since the accommodating case for disc cartridge according to this invention is adapted so that the upper surface side and the front side of the case body are opened, it is possible to carry out insertion/withdrawal of disc cartridge of which thickness is thin as compared to the size of plane (outside dimensions) without undergoing restriction in the direction of insertion/withdrawal with respect to the case body. Accordingly, the accommodating operation becomes easy.

Further, since means for carrying out positioning of the accommodating position of the disc cartridge is provided at the case body, it is possible to securely prevent such an unfavorable operation to inadvertently fall down the accommodated disc cartridge at the time of opening/closing operation of the cover body. Thus, reliable protection of the disc cartridge is realized.

Furthermore, since the cover body is adapted so that the cover closing position is supported by the limiting portions provided at the case body, even if the cover body and/or the case body are pressed so that they are deformed, it can be prevented that pressing force is directly applied to the disc cartridge. Thus, reliable protection of the accommodated disc cartridge can be realized.

In addition, since the indicating portion indicating the accommodating direction of the disc cartridge is provided at the bottom plate, the disc cartridge can be securely accommodated in a fixed direction. Thus, the accommodating operation becomes easy.

We claim:

1. An accommodating case for a disc cartridge comprising:
    a case body having:
        a bottom plate having a top surface, a front sidewall surface, a back sidewall surface, a front edge defined where the top surface meets the front sidewall surface, and a back edge defined where the top surface meets the back sidewall surface;
        a first case sidewall extending away from the top surface of the bottom plate, and having a first limiting portion,
        a second case sidewall extending away from the top surface of the bottom plate, and having a second limiting portion,
        a disc accommodation region defined on the top surface of the bottom plate between the front and back edges and the first and second case sidewalls, the disc accommodation region having a minimum area equal to an area of the disc cartridge, a front end spaced apart from the front edge of the bottom plate, and a back end spaced apart from the back edge of the bottom plate;
        a front disc position limiter formed to extend away from the top surface of the bottom plate, the front disc position limiter contacting the front end of the disc accommodation region, being spaced away from the front edge of the bottom plate, and preventing a disc cartridge positioned on the bottom plate from moving past the front end of the disc accommodation region towards the front edge of the bottom plate; and
    a cover body rotatably attached to the first and second case sidewalls in a region proximate to the back edge of the bottom plate, the first and second limiting portions supporting the cover body when the accommodating case is closed.

2. An accommodating case for a disc cartridge as set forth in claim 1,
    and further comprising a front wall, the front wall extending from the first case sidewall to the second case sidewall along the front edge of the bottom plate when the accommodating case is closed, the front disc position limiter being spaced apart from the front wall.

3. An accommodating case for a disc cartridge as set forth in claim 1,
    wherein the cover body has:
        a top plate having a bottom side, and
        a front wall extending away from the bottom side of the top plate, the front wall contacting the case body and being spaced apart from the front disc position limiter when the accommodating case is closed.

4. An accommodating case for a disc cartridge as set forth in claim 3,
    wherein the cover body further has:
        a first cover sidewall extending away from the bottom side of the top plate,
        a second cover sidewall extending away from the bottom side of the top plate, and
        supporting projections formed on the first and second cover sidewalls for supporting printed matter.

5. An accommodating case for a disc cartridge as set forth in claim 1 wherein the case body further includes a back disc position limiter formed to extend away from the top surface of the bottom plate, the back disc position limiter contacting the back end of the disc accommodation region, being spaced away from the back edge of the bottom plate, and preventing a disc cartridge positioned on the bottom plate from moving past the back end of the disc accommodation region towards the back edge of the bottom plate.

6. An accommodating case for a disc cartridge as set forth in claim 5, wherein the back disc position limiter includes a projection which extends towards the front end of the accommodation region, the projection fitting within a groove on the disc cartridge when the disc cartridge is positioned within the accommodating case.

7. An accommodating case for a disc cartridge as set forth in claim 6, wherein a recessed opening is formed in the bottom plate adjacent to where the back disc position limiter contacts the bottom plate.

8. An accommodating case for a disc cartridge as set forth in claim 1,
    wherein the case body further includes a top disc position limiter formed to extend away from a case sidewall between the front and back disc position limiters, the top position limiter preventing a disc cartridge positioned on the bottom plate from contacting the case cover when the accommodating case is in a closed position.

9. An accommodating case for a disc cartridge as set forth in claim 8,
    wherein the case body further includes a back disc position limiter formed to extend away from the top surface of the bottom plate, the back disc position limiter contacting the back end of the disc accommodation region, being spaced away from the back edge of the bottom plate, and preventing a disc cartridge positioned on the bottom plate from moving past the back end of the disc accommodation region towards the back edge of the bottom plate.

10. An accommodating case for a disc cartridge as set forth in claim 9,
    wherein the back disc position limiter includes an engagement projection which extends towards the front edge, the engagement projection fitting within a groove on the disc cartridge when the disc cartridge is positioned within the accommodating case, the back disc position limiter being deformable.

11. An accommodating case for a disc cartridge as set forth in claim 1,
    wherein the cover body has:
        a top plate having a bottom side, and
        a front wall extending away from the bottom side of the top plate, the front wall contacting the case body and being spaced apart from the front disc position limiter when the accommodating case is closed; and a back wall extending away from the bottom side of the top plate;

wherein a recess shaped portion corresponding to a locus of rotation of the back wall is formed in the bottom plate.

12. An accommodating case for a disc cartridge as set forth in claim 11, wherein an inclined surface portion substantially along the locus of rotation is formed in the back wall.

13. An accommodating case for a disc cartridge as set forth in claim 11, wherein the case body further includes a back disc position limiter formed to extend away from the top surface of the bottom plate, the back disc position limiter contacting the back end of the disc accommodation region, being spaced away from the back wall of the top plate, and preventing a disc cartridge positioned on the bottom plate from moving past the back end of the disc accommodation region towards the back wall of the top plate.

14. An accommodating case for a disc cartridge as set forth in claim 1, wherein the cover body includes first engagement means and the case body includes second engagement means, the first and second engagement means securing the cover body to the case body when the accommodating case is closed.

15. An accommodating case for a disc cartridge as set forth in claim 1, wherein the cover body includes an opening, and the first case sidewall of the bottom plate includes a projection such that the projection is positioned within the opening when the accommodating case is closed, the projection and opening securing the cover body to the case body when the accommodating case is closed.

16. An accommodating case for a disc cartridge comprising:

a case body including:

a bottom plate on which the disc cartridge is mounted, the bottom plate having a pair of opposing sides;

a pair of side walls connected to the pair of opposing sides of the bottom plate, each side wall having a base connected to the bottom plate, a front end, a top surface, and a limiting portion, an upper surface side of the case body being defined by a plane that contacts each top surface, a front side of the case body being defined by a plane that contacts each front end of the pair of side walls;

at least the upper surface side and the front side of the case body being open, and a cover body rotatable supported by the case body, the cover body including:

a top plate having a pair of opposing sides;

a pair of side walls connected to the pair of opposing sides of the cover body, the side walls of the cover body being fitted between the pair of side walls of the case body;

a base wall connected to the top plate;

a front wall connected to the top plate;

the top plate and the front wall covering the upper surface side and the front side of the case body when the accommodation case is closed, wherein the limiting portion of each side wall supports the cover body when the cover body is rotated into a closed position which covers the upper surface side and the front side of the case body, wherein the limiting portion of each side wall of the case body includes first and second step portions different in height measured away from the bottom plate, and an inclined surface portion for allowing the first step portion and the second step portion to be continuous, the first and second step portions and the inclined surface portion being continuously formed in a length direction of each side wall, and wherein the side walls of the cover body are supported by the limiting portions, each of the side walls of the cover body having first and second step portions and an inclined surface portion for allowing the first and second step portions of the side walls of the cover body to be continuous.

17. An accommodating case for a disc cartridge as set forth in claim 16, wherein the first step portions of the first and second case sidewalls are formed to have a height measured from the bottom plate which is substantially equal to a thickness of the disc cartridge.

18. An accommodating case for a disc cartridge comprising:

a case body including:

a bottom plate on which the disc cartridge is mounted, the bottom plate having a pair of opposing sides;

a pair of side walls connected to the pair of opposing sides of the bottom plate, each side wall having a base connected to the bottom plate, a front end, a top surface, and a limiting portion, an upper surface side of the case body being defined by a plane that contacts each top surface, a front side of the case body being defined by a plane that contacts each front end of the pair of side walls;

supporting means protruding from an internal side of each side wall of the pair of side walls for supporting an upper surface side of the disc cartridge when the disc cartridge is positioned on the bottom plate;

accommodating position limiting means for limiting movement of a disc cartridge in a direction perpendicular to the thickness direction of the disc cartridge when the disc cartridge is positioned on the bottom plate;

wherein the accommodating position limiting means includes:

a limiting piece for supporting a first side surface of an insertion end side of the disc cartridge, and a supporting portion for supporting a second side surface opposite to the first side surface of the insertion end side of the disc cartridge;

at least the upper surface side and the front side of the case body being open, and a cover body rotatable supported by the case body, the cover body including:

a top plate having a pair of opposing sides;

a pair of side walls connected to the pair of opposing sides of the cover body, the side walls of the cover body being fitted between the pair of side walls of the case body;

a base wall connected to the top plate;

a front wall connected to the top plate;

the top plate and the front wall covering the upper surface side and the front side of the case body when the accommodation case is closed, wherein the limiting portion of each side wall of the case body supports the cover body when the cover body is rotated into a closed position which covers the upper surface side and the front side of the case body.

19. An accommodating case for a disc cartridge as set forth in claim 18, wherein the supporting portion is formed by a projected portion formed extending in a height direction of one side wall of the case body, a circumferential surface of the supporting portion having a circular arc surface and an inclined surface portion formed at a front end side an end of the supporting portion which is spaced apart from the bottom plate of the case body.

20. An accommodating case for a disc cartridge as set forth in claim 18, wherein the limiting piece includes an engagement projection which extends towards the front side, the engagement projection fitting within a groove on the disc cartridge when the disc cartridge is positioned within the accommodating case.

21. An accommodating case for a disc cartridge as set forth in claim 20, wherein a recessed opening is formed in the bottom plate adjacent to where the limiting piece contacts the bottom plate.

22. An accommodating case for a disc cartridge as set forth in claim 18, wherein the limiting piece includes:
 a first limiting piece that supports a first side surface of the insertion end side of the disc cartridge, and
 a second limiting piece that supports a second side surface of the insertion end side of the disc cartridge, the second limiting piece having an engagement projection that engages an engagement groove of a disc cartridge when positioned on the bottom plate.

23. An accommodating case for a disc cartridge as set forth in claim 18, wherein the limiting piece includes an engagement projection which extends towards the front side, the engagement projection fitting within a groove on the disc cartridge when the disc cartridge is positioned within the accommodating case, the limiting piece being proximate to a first side of a side wall, and wherein the supporting portion is proximate to a second side of the side wall.

24. An accommodating case for a disc cartridge as set forth in claim 18, wherein an indicating portion indicating direction of insertion of the disc cartridge with respect to the case body is provided on the bottom plate of the case body.

25. An accommodating case for a disc cartridge as set forth in claim 18, wherein an indicating portion indicating accommodating direction of the disc cartridge with respect to the case body is provided on the bottom plate of the case body.

26. An accommodating case for a disc cartridge as set forth in claim 25, wherein the indicating portion includes a graphical form indicating form of appearance of the disc cartridge as accommodated.

27. An accommodating case for a disc cartridge as set forth in claim 18, wherein an indicating portion indicating rotational direction with respect to the case body is provided on the cover body.

* * * * *

UNITED STATES PATENT AND TRADEMARK OFFICE
CERTIFICATE OF CORRECTION

PATENT NO.: 5,931,296
DATED: August 3, 1999
INVENTOR(S): DAIKI KOBAYASHI ET AL.

It is certified that errors appear in the above-identified patent and that said Letters Patent is hereby corrected as shown below:

Col. 26, line 52, change "rotatable" to "rotatably"
In the Abstract, line 20, change "form" to "from"

Signed and Sealed this

Twenty-first Day of November, 2000

Attest:

Q. TODD DICKINSON

Attesting Officer

Director of Patents and Trademarks